United States Patent [19]

Oguro

[11] Patent Number: 5,579,120
[45] Date of Patent: Nov. 26, 1996

[54] COPYRIGHT PROTECTION FOR DIGITAL SIGNAL RECORDING AND/OR REPRODUCTION AND RECORDING MEDIUM THEREOF

[75] Inventor: Masaki Oguro, Tokyo, Japan

[73] Assignee: Sony Corporation, Tokyo, Japan

[21] Appl. No.: 313,382

[22] Filed: Sep. 27, 1994

[30] Foreign Application Priority Data

Oct. 8, 1993 [JP] Japan .................. 5-277633

[51] Int. Cl.⁶ ........................ H04N 5/76; G11B 15/04; G11B 19/04
[52] U.S. Cl. ................................ 386/94; 360/60
[58] Field of Search ........................ 358/335, 342; 360/33.1, 60; 380/5, 20; H04N 7/167

[56] References Cited

U.S. PATENT DOCUMENTS

| | | | |
|---|---|---|---|
| 4,855,827 | 8/1989 | Best | 358/143 |
| 5,295,188 | 3/1994 | Wilson et al. | 380/30 |
| 5,315,448 | 5/1994 | Ryan | 380/5 |
| 5,402,488 | 3/1995 | Karlock | 380/5 |
| 5,418,853 | 5/1995 | Kanota et al. | 380/5 |

FOREIGN PATENT DOCUMENTS

| | | |
|---|---|---|
| 0441702 | 8/1991 | European Pat. Off. . |
| 0548887 | 6/1993 | European Pat. Off. . |
| WO92/16944 | 10/1992 | WIPO . |

*Primary Examiner*—Tommy P. Chin
*Assistant Examiner*—Y. Lee
*Attorney, Agent, or Firm*—William S. Frommer; Alvin Sinderbrand

[57] ABSTRACT

A digital image signal recording and/or reproduction method and/or apparatus by which a copyright protection signal employed by a software tape for use with an analog video tape recorder can be recorded and/or reproduced with a digital video tape recorder of the compression type. When a copyright protection signal detection circuit detects a disturbing signal inserted in a video signal, an output of an analog to digital converter is stored into a memory. An H counter supplies a line number upon detection of the disturbing signal as LINES data to a line pack processing microcomputer. The data of the memory are supplied as line data to the line pack processing microcomputer under the switching control of a switching circuit. Using the received data, the line pack processing microcomputer produces pack data and sends the pack data to a format converter of a digital video tape recorder.

17 Claims, 29 Drawing Sheets

FIG. 5(a)
WHEN APT = 000
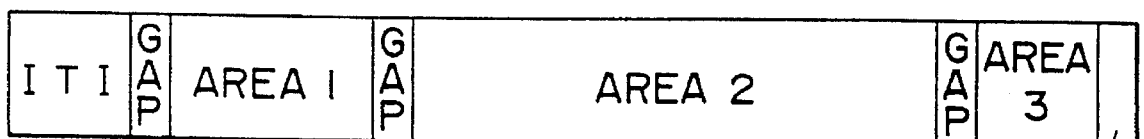
OVERWRITE MARGIN
FIG. 5(b)
FURTHER WHEN AP1 = AP2 = AP3 = 0
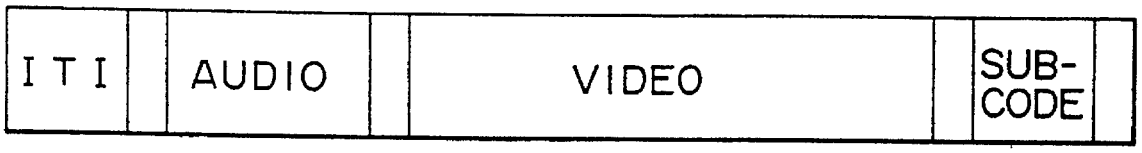
FIG. 6
| WORD NAME | MSB                LSB |
|-----------|------------------------|
| PC 0      | HEADER                 |
| PC 1      |                        |
| PC 2      | DATA                   |
| PC 3      |                        |
| PC 4      |                        |

- UPPER HEADER
- LOWER HEADER
- LOWERMOST LAYER BY BIT ASSIGNMENT

| MSB | LSB | |
|---|---|---|
| UPPER | LOWER | |
| 0 0 0 0 | x x x x | CONTROL |
| 0 0 0 1 | x x x x | TITLE |
| 0 0 1 0 | x x x x | CHAPTER |
| 0 0 1 1 | x x x x | PART |
| 0 1 0 0 | x x x x | PROGRAM |
| 0 1 0 1 | x x x x | AAUX |
| 0 1 1 0 | x x x x | VAUX |
| 0 1 1 1 | x x x x | CAMERA |
| 1 0 0 0 | x x x x | LINE |
| 1 0 0 1 ⋮ 1 1 1 0 | x x x x ⋮ x x x x | RESERVED |
| 1 1 1 1 | a a a a | SOFT MODE |
| 1 1 1 1 | 1 1 1 1 | NO INFORMATION | a a a a   0 0 0 0 ~ 1 1 1 0
x x x x   0 0 0 0 ~ 1 1 1 1

PRE-SYNC BLOCK

POST-SYNC BLOCK

▨ : AAUX

▦ : AUDIO DATA

FIG. 13
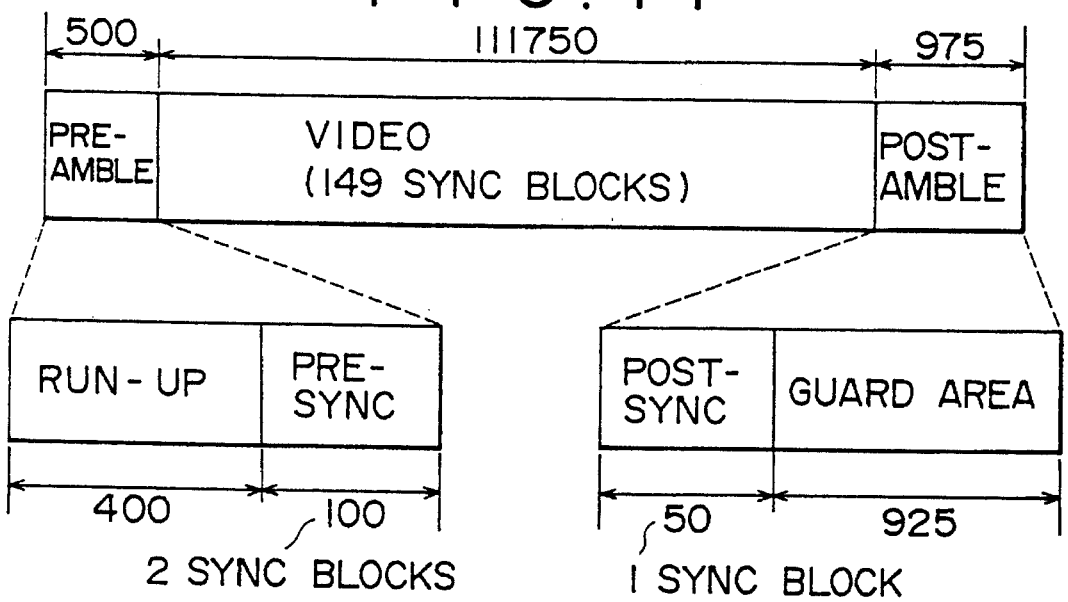
FIG. 14
FIG. 15
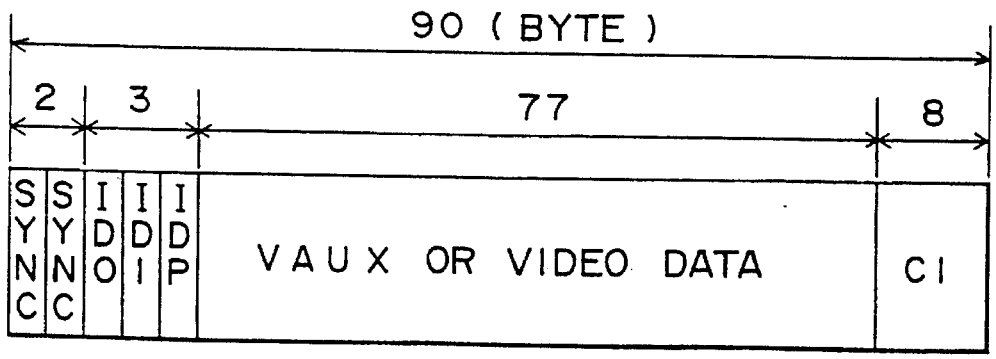

▨ : VAUX

FIG. 19(a)

PRE-SYNC, POST-SYNC
C2 PARITY SYNC

| | ID0 | ID1 |
|---|---|---|
| MSB | APPLI 2 | SYNC 7 |
| | APPLI 1 | SYNC 6 |
| | APPLI 0 | SYNC 5 |
| | SEQ 0 | SYNC 4 |
| | TRACK 3 | SYNC 3 |
| | TRACK 2 | SYNC 2 |
| | TRACK 1 | SYNC 1 |
| LSB | TRACK 0 | SYNC 0 |

FIG. 19(b)

AAUX + AUDIO SYNC
VIDEO SYNC

| | ID0 | ID1 |
|---|---|---|
| MSB | SEQ 3 | SYNC 7 |
| | SEQ 2 | SYNC 6 |
| | SEQ 1 | SYNC 5 |
| | SEQ 0 | SYNC 4 |
| | TRACK 3 | SYNC 3 |
| | TRACK 2 | SYNC 2 |
| | TRACK 1 | SYNC 1 |
| LSB | TRACK 0 | SYNC 0 |

FIG. 20
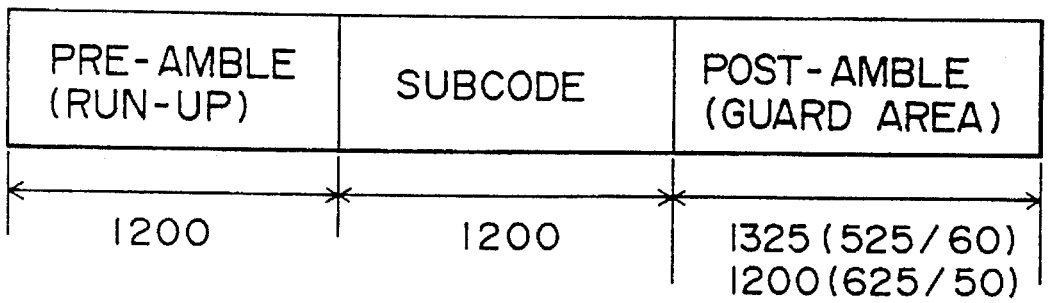
| PRE-AMBLE (RUN-UP) | SUBCODE | POST-AMBLE (GUARD AREA) |
|---|---|---|
| 1200 | 1200 | 1325 (525/60)<br>1200 (625/50) |
FIG. 21
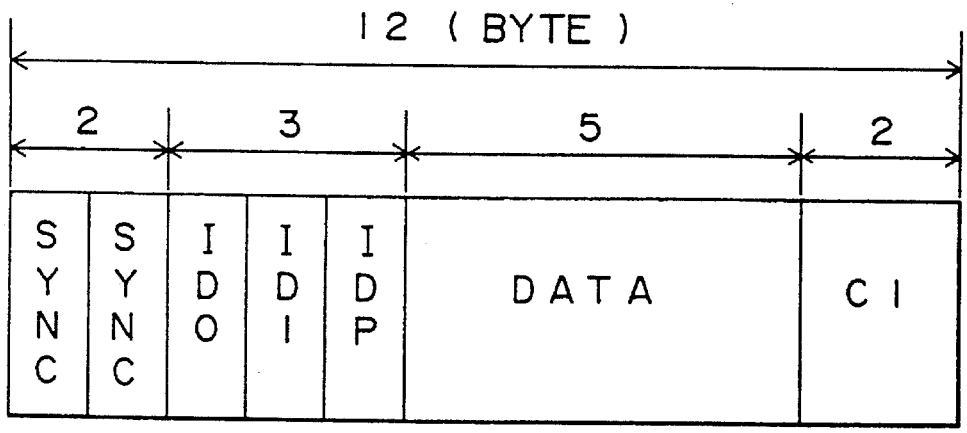
FIG. 23

FIG. 22(a)

SYNC NUMBER 0, 6

|  | ID0 | ID1 |
|---|---|---|
| MSB | F/R | ABSTR3 |
|  | AP33 | ABSTR2 |
|  | AP32 | ABSTR1 |
|  | AP31 | ABSTR0 |
|  | ABSTR7 | SYNC3 |
|  | ABSTR6 | SYNC2 |
|  | ABSTR5 | SYNC1 |
| LSB | ABSTR4 | SYNC0 |

FIG. 22(b)

SYNC NUMBER OTHER THAN 0, 6

|  | ID0 | ID1 |
|---|---|---|
| MSB | F/R | ABSTR3 |
|  | INDEX | ABSTR2 |
|  | SKIP | ABSTR1 |
|  | PP | ABSTR0 |
|  | ABSTR7 | SYNC3 |
|  | ABSTR6 | SYNC2 |
|  | ABSTR5 | SYNC1 |
| LSB | ABSTR4 | SYNC0 |

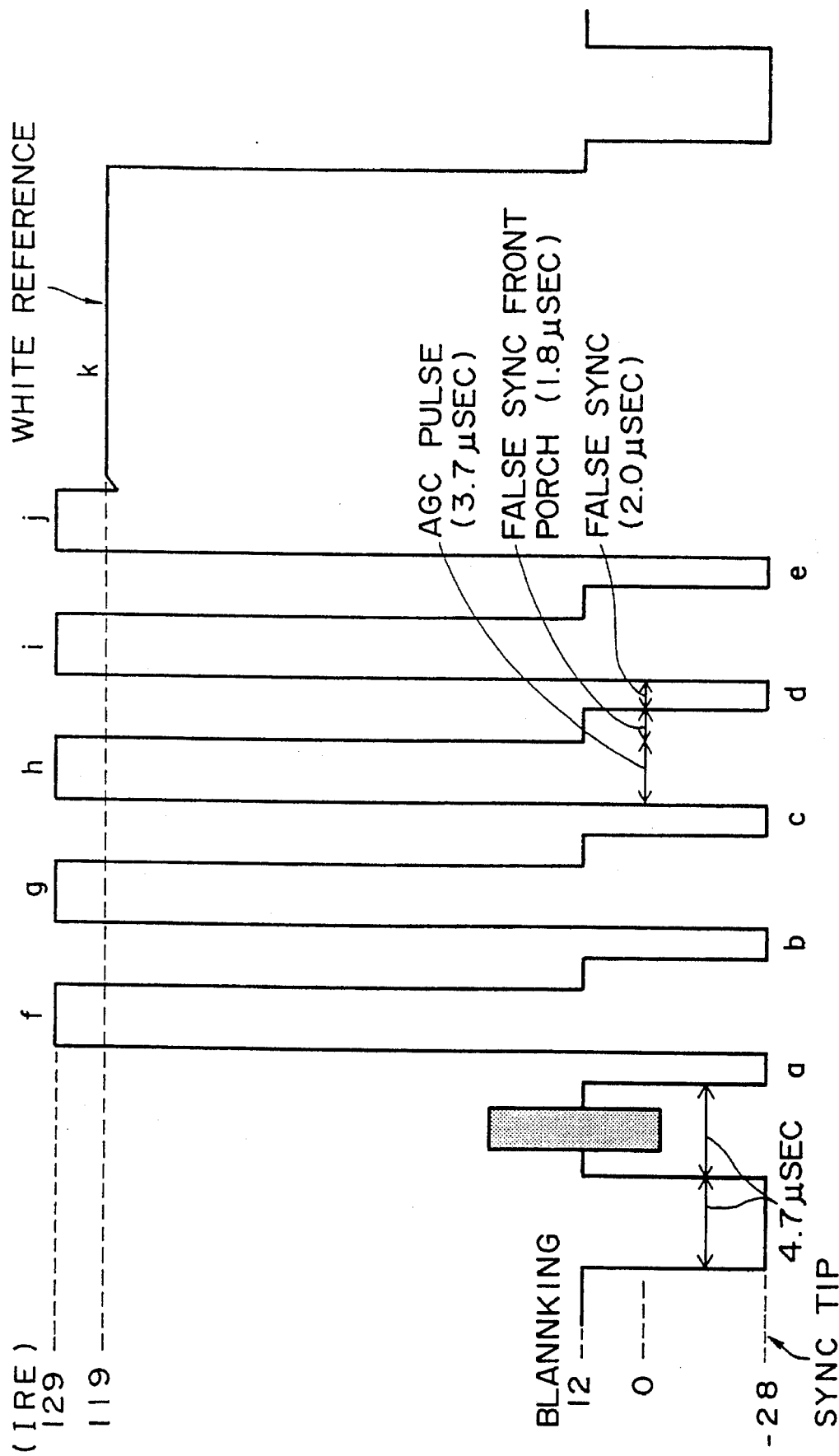

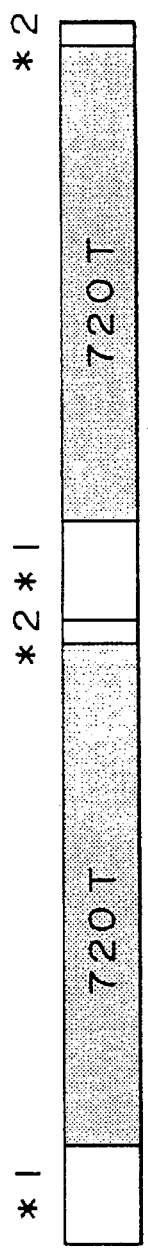
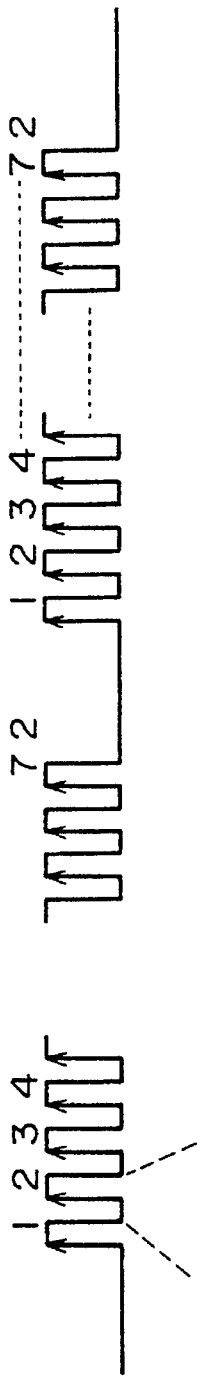
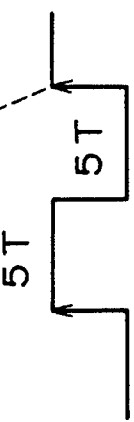
FIG. 26(a)
FIG. 26(b)
FIG. 26(c)
T = 1/13.5 MHz
*1  525/60 : 122T
    625/50 : 132T
*2  525/60 : 16T
    625/50 : 12T

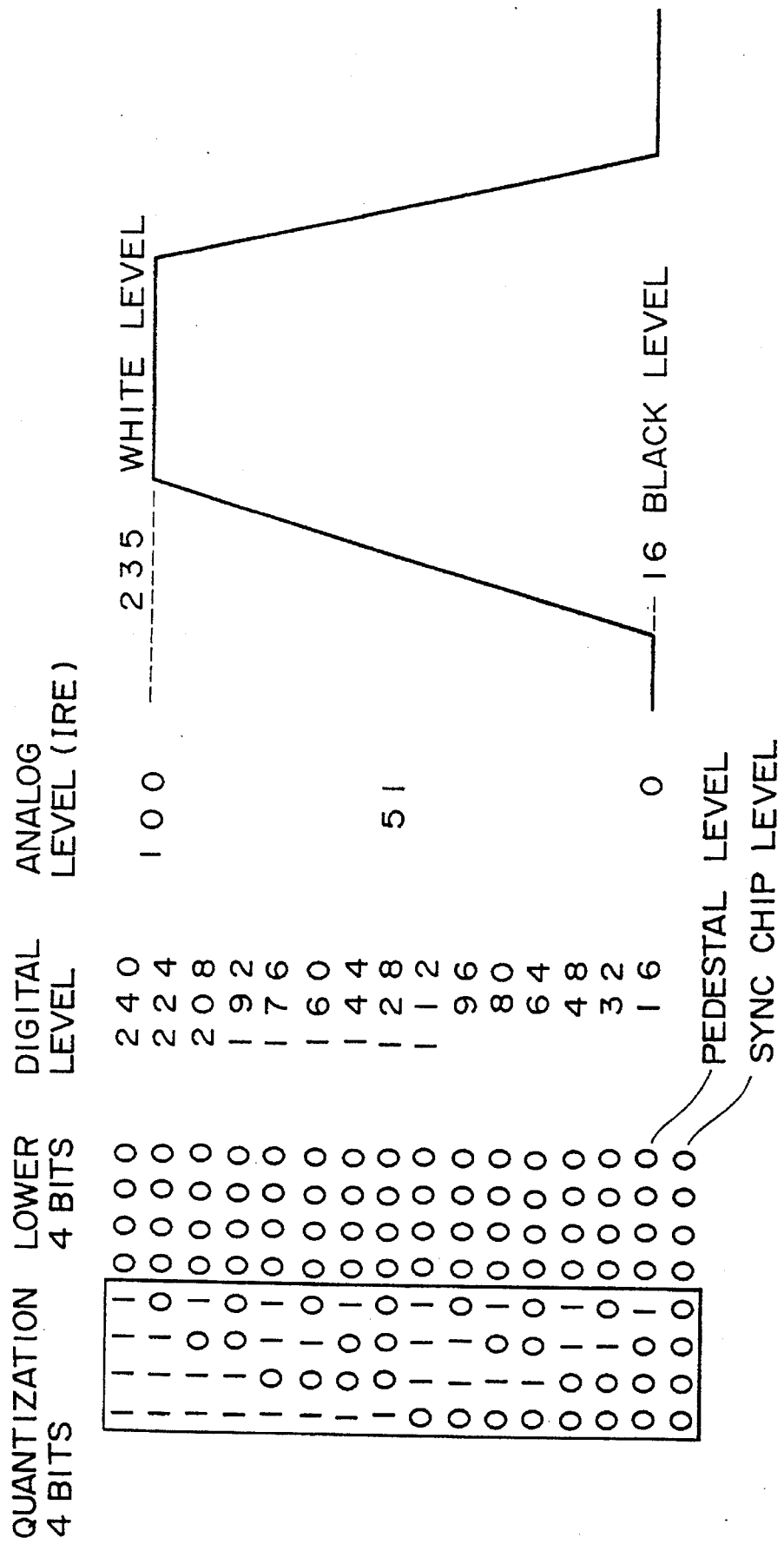

FIG. 28(a) LINE HEADER PACK

| | MSB | | | | | | | LSB |
|---|---|---|---|---|---|---|---|---|
| PC0 | 1 | 0 | 0 | 0 | 0 | 0 | 0 | 0 |
| PC1 | LINES (BINARY) ||||||||
| PC2 | B/W | EN || CLF || CM |||
| PC3 | TDS (BINARY) ||||||||
| PC4 | QU || SAMPLING fr. ||||||

FIG. 28(b) Y PACK

| | MSB | | | | | | | LSB |
|---|---|---|---|---|---|---|---|---|
| PC0 | 1 | 0 | 0 | 0 | 0 | 0 | 0 | 1 |
| PC1 | | | | | | | | |
| PC2 | | | | | | | | |
| PC3 | | | | | | | | |
| PC4 | | | | | | | | |

| | | EFFECTIVE SCANNING PERIOD | NEXT LINE |
|---|---|---|---|
| 525/60 SYSTEM | 122T | 720T | 16T |
| 625/50 SYSTEM | 132T | 720T | 12T |

HALF LEVEL OF HORIZONTAL SYNC. SIGNAL

T: 1/13.5MHz

FIG. 29

| LINE 13 | | | LINE 20 | |
|---|---|---|---|---|
| 1 0 0 0 0 0 0 0 | | — LINE HEADER PACK | 1 0 0 0 0 0 0 0 | |
| 0 0 0 0 1 1 0 1 | | — LINE = L3 | 0 0 0 1 0 1 0 0 | |
| 1 1 1 1 0 0 0 0 | | — B/W = COLOR, CLF = INVALID, CM = 0 | 1 1 1 1 0 0 0 0 | |
| 0 1 0 0 1 0 0 0 | | | 0 1 0 0 1 0 0 0 | |
| 0 1 0 1 1 0 0 0 | | — TDS = 72 | 0 1 0 1 1 0 0 0 | |
| 1 0 0 0 0 0 0 1 | | — QU = 4BITS, f = 13.5MHz | 1 0 0 0 0 0 0 1 | |
| S 2 | S 1 | — Y PACK | S 2 | S 1 |
| S 4 | S 3 | SAMPLE DATA 1~8 | S 4 | S 3 |
| S 6 | S 5 | | S 6 | S 5 |
| S 8 | S 7 | | S 8 | S 7 |
| 1 0 0 0 0 0 0 1 | | | 1 0 0 0 0 0 0 1 | |
| S 10 | S 9 | | S 10 | S 9 |
| S 12 | S 11 | | S 12 | S 11 |
| S 14 | S 13 | | S 14 | S 13 |
| S 16 | S 15 | | S 16 | S 15 |
| 1 0 0 0 0 0 0 1 | | | 1 0 0 0 0 0 0 1 | |
| S 18 | S 17 | | S 18 | S 17 |
| S 20 | S 19 | | S 20 | S 19 |
| S 22 | S 21 | | S 22 | S 21 |
| S 24 | S 23 | | S 24 | S 23 |
| 1 0 0 0 0 0 0 1 | | | 1 0 0 0 0 0 0 1 | |
| S 26 | S 25 | | S 26 | S 25 |
| S 28 | S 27 | | S 28 | S 27 |
| S 30 | S 29 | | S 30 | S 29 |
| S 32 | S 31 | | S 32 | S 31 |
| 1 0 0 0 0 0 0 1 | | | 1 0 0 0 0 0 0 1 | |
| S 58 | S 57 | | S 58 | S 57 |
| S 60 | S 59 | | S 60 | S 59 |
| S 62 | S 61 | | S 62 | S 61 |
| S 64 | S 63 | | S 64 | S 63 |
| 1 0 0 0 0 0 0 1 | | | 1 0 0 0 0 0 0 1 | |
| S 66 | S 65 | | S 66 | S 65 |
| S 68 | S 67 | | S 68 | S 67 |
| S 70 | S 69 | | S 70 | S 69 |
| S 72 | S 71 | | S 72 | S 71 |

FIG. 30

| PACK\TRACK | 1 | 2 | 3 | 4 | 5 | 6 | 7 | 8 | 9 | 10 |
|---|---|---|---|---|---|---|---|---|---|---|
| 45 | 65 | Y | 65 |  | 65 |  | 65 |  | 65 |  |
| 44 | 64 | Y | 64 |  | 64 |  | 64 |  | 64 |  |
| 43 | 63 | Y | 63 |  | 63 |  | 63 |  | 63 |  |
| 42 | 62 | Y | 62 |  | 62 |  | 62 |  | 62 |  |
| 41 | 61 | Y | 61 |  | 61 |  | 61 |  | 61 |  |
| 40 | 60 | Y | 60 |  | 60 |  | 60 |  | 60 |  |
| 39 | Y | Y |  |  |  |  |  |  |  |  |
| 38 | Y | LH |  |  |  |  |  |  |  |  |
| 37 | Y | Y |  |  |  |  |  |  |  |  |
| 36 | Y | Y |  |  |  |  |  |  |  |  |
| 35 | Y | Y |  |  |  |  |  |  |  |  |
| 34 | Y | Y |  |  |  |  |  |  |  |  |
| 33 | Y | Y |  |  |  |  |  |  |  |  |
| 32 | Y | Y |  |  |  |  |  |  |  |  |
| 31 | Y | Y |  |  |  |  |  |  |  |  |
| 30 | LH | Y |  |  |  |  |  |  |  |  |
| 29 | Y | Y |  |  |  |  |  |  |  |  |
| 28 | Y | Y |  |  |  |  |  |  |  |  |
| 27 | Y | LH |  |  |  |  |  |  |  |  |
| 26 | Y | Y |  |  |  |  |  |  |  |  |
| 25 | Y | Y |  |  |  |  |  |  |  |  |
| 24 | Y | Y |  |  |  |  |  |  |  |  |
| 23 | Y | Y |  |  |  |  |  |  |  |  |
| 22 | Y | Y |  |  |  |  |  |  |  |  |
| 21 | Y | Y |  |  |  |  |  |  |  |  |
| 20 | LH | Y |  |  |  |  |  |  |  |  |
| 19 | Y | Y |  |  |  |  |  |  |  |  |
| 18 | Y | Y |  |  |  |  |  |  |  |  |
| 17 | Y | LH |  |  |  |  |  |  |  |  |
| 16 | Y | Y |  |  |  |  |  |  |  |  |
| 15 | Y | Y |  |  |  |  |  |  |  |  |
| 14 | Y | Y |  |  |  |  |  |  |  |  |
| 13 | Y | Y |  |  |  |  |  |  |  |  |
| 12 | Y | Y |  |  |  |  |  |  |  |  |
| 11 | Y | Y |  |  |  |  |  |  |  |  |
| 10 | LH | Y |  |  |  |  |  |  |  |  |
| 9 | Y | Y |  |  |  |  |  |  |  |  |
| 8 | Y | Y |  |  |  |  |  |  |  |  |
| 7 | Y | LH |  |  |  |  |  |  |  |  |
| 6 | Y | Y |  |  |  |  |  |  |  |  |
| 5 | Y | 65 |  | 65 |  | 65 |  | 65 |  | 65 |
| 4 | Y | 64 |  | 64 |  | 64 |  | 64 |  | 64 |
| 3 | Y | 63 |  | 63 |  | 63 |  | 63 |  | 63 |
| 2 | Y | 62 |  | 62 |  | 62 |  | 62 |  | 62 |
| 1 | Y | 61 | Y | 61 |  | 61 |  | 61 |  | 61 |
| 0 | LH | 60 | Y | 60 |  | 60 |  | 60 |  | 60 |

LH : LINE HEADER PACK
Y : Y PACK

FIG. 31
PRINT HOUSE
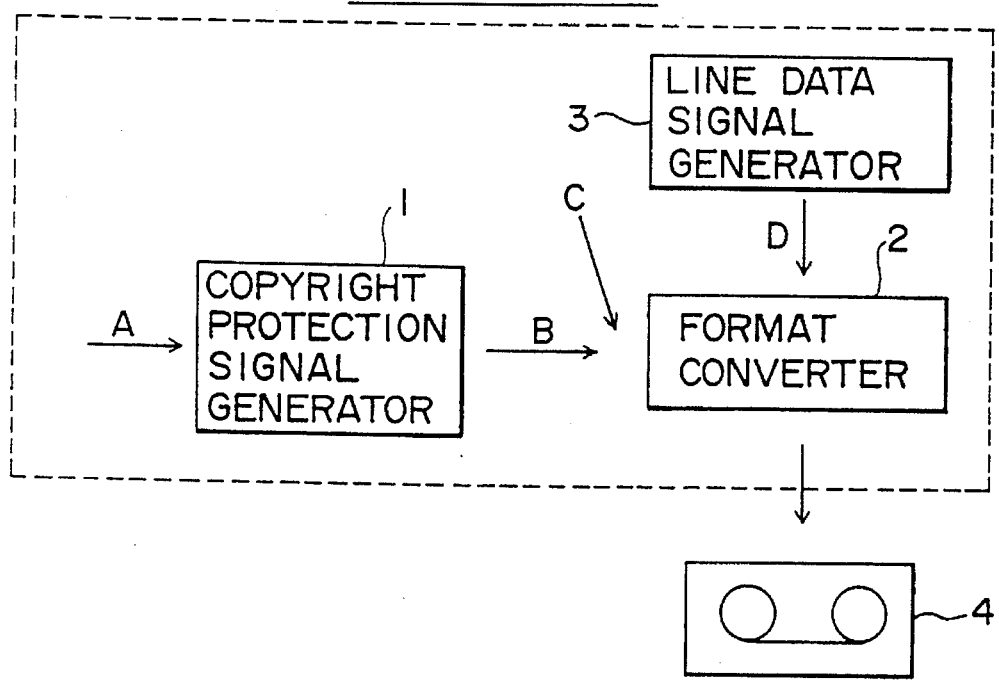
USER
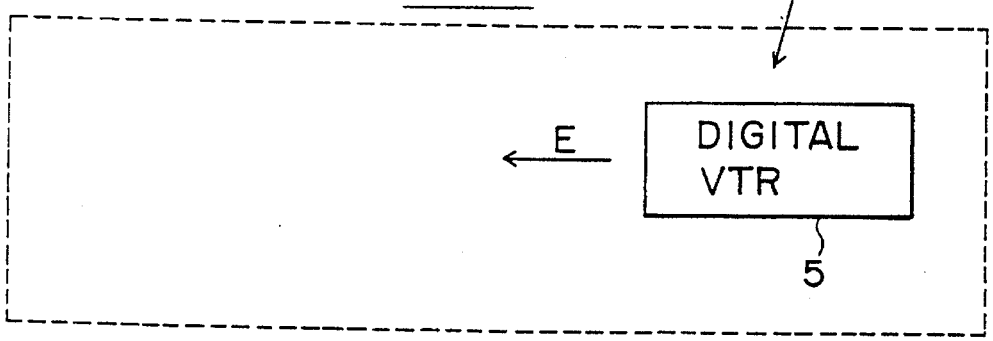
- A : ANALOG VIDEO SIGNAL
- B : ANALOG VIDEO SIGNAL IN WHICH COPYRIGHT PROTECTION SIGNAL IS INSERTED
- C : ANALOG OR DIGITAL AUDIO SIGNAL
- D : COPYRIGHT PROTECTION SIGNAL EXTRACTED FROM B & DIGITIZED
- E : ANALOG VIDEO SIGNAL IN WHICH COPYRIGHT PROTECTION SIGNAL IS INSERTED
- 4 : DIGITAL SOFTWARE TAPE TO WHICH DIGITAL COPYRIGHT PROTECTION SIGNAL IS ADDED

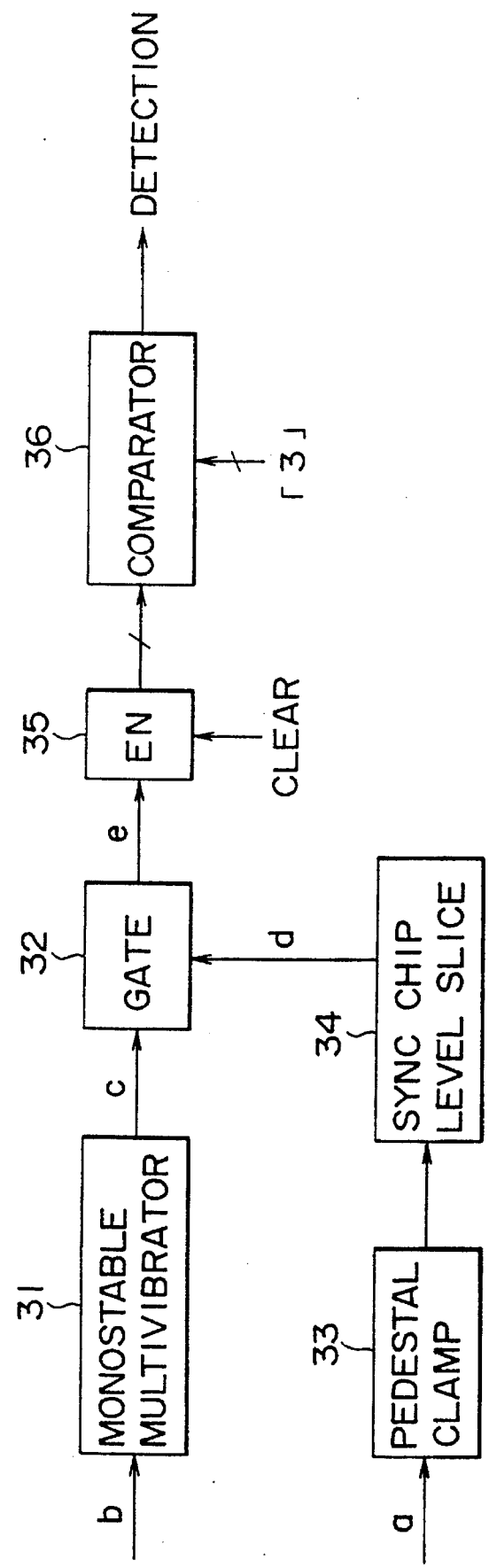
F I G. 32

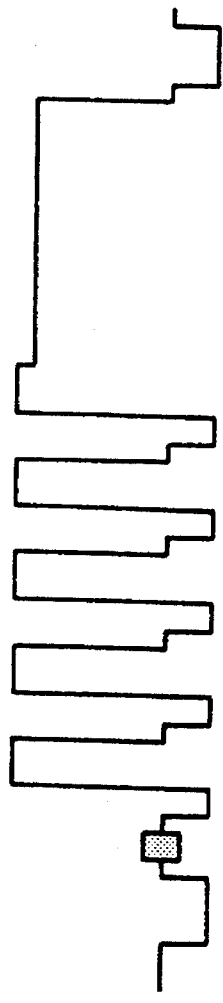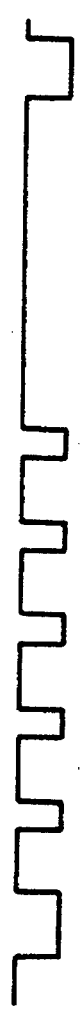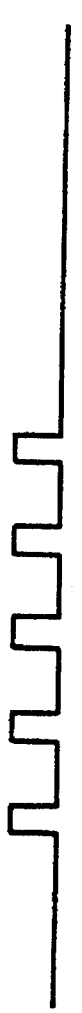
F I G. 33(a)   F I G. 33(b)   F I G. 33(c)   F I G. 33(d)   F I G. 33(e)

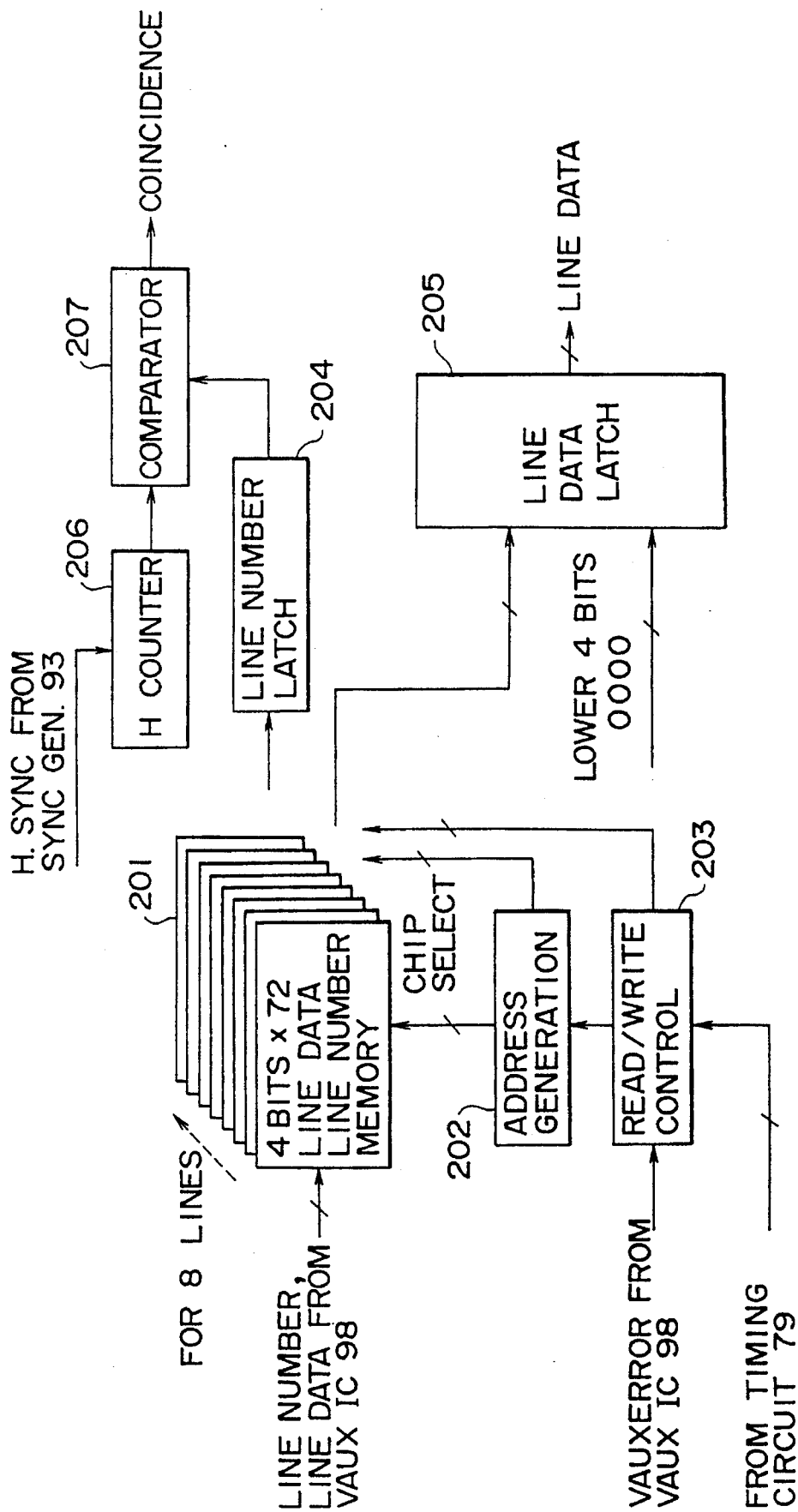

COPYRIGHT PROTECTION FOR DIGITAL SIGNAL RECORDING AND/OR REPRODUCTION AND RECORDING MEDIUM THEREOF

BACKGROUND OF THE INVENTION

This invention relates to a digital image recording and/or reproduction method and an apparatus by which a digital image signal is coded and recorded on a recording medium and/or read and decoded for reproduction.

On a software tape for use with an analog video tape recorder, a signal is recorded so as to disturb operation of an AGC (Automatic Gain Control) of a recording amplifier of a video tape recorder. The disturbing signal is inserted in a predetermined line within a vertical blanking period of a television signal for the object of copyright protection. Due to this disturbing signal, when a software tape is illegally dubbed, then the dubbed tape is recorded in a condition wherein the reproduced signal is illegible. As a result, the copyright is protected.

On the other hand, in digital video tape recorders, an image compression technique has made a remarkable development in recent years. It is a common practice to decrease the overall amount of recording signals in order to improve the picture quality. Therefore, such portions as a vertical blanking portion are omitted, because they have no direct relationship to the picture.

For example, in the case of the 525/60 system, 720 samples of data for an effective scanning period shown in FIG. 39 are extracted with respect to 240 lines out of 23H to 262H in an odd-numbered field and 240 lines out of 285H to 524H in an even-numbered field. Similarly, in the case of the 625/50 system, 720 samples of data for an effective scanning period shown in FIG. 39 are extracted with respect to 288 lines out of 23H to 310H in an odd-numbered field and 288 lines of 335H to 622H in an even-numbered field.

Image data obtained by extracting only actual image portions in this manner are compressed to reduce the amount of data recorded. Thus recorded image data are processed, upon reproduction, by reverse processes to those performed upon recording.. Therefore, the vertical blanking portions and horizontal blanking portions, which were deleted upon recording, are added to the image data so that a composite video signal are outputted.

When it is tried to make a software tape for a digital video tape recorder using such an image compression technique as described above, since only actual image portions are recorded as described above, it is impossible to insert a disturbing signal for a vertical blanking period, which is recorded inserted in a software tape for use with an analog VTR for the object of copyright protection.

The SCMS (Serial Copy Management System) which has been put into practical use in the field of digital audio tapes is effective for the copyright protection between digital video tape recorders. It cannot be anticipated for digital video tape recorders the same kind of copyright protection which is adopted in analog video tape recorders such as VHS video tape recorders, most popularly spread at present.

SUMMARY OF THE INVENTION

It is an object of the present invention to provide a digital image signal recording and/or reproduction method and apparatus of the data compression type by which a disturbing signal can be recorded and played back. The disturbing signal is inserted in a portion other than a portion where an actual image of an image signal for the object of copyright protection such as a disturbing signal employed by a software tape for an analog video tape recorder.

It is another object of the present invention to provide a recording medium on which a disturbing signal for the object of copyright protection is recorded together with a digital image signal.

In order to attain the objects described above, according to an aspect of the present invention, there is provided a method of recording a digital image signal which has a recording format including a recording area for a coded image signal and another recording area for incident information, the recording area for incident information having a pack structure which includes a header pack for recording line designation data designating an arbitrary line of the image signal and a parameter regarding coding of the recording signal and a data pack for recording data obtained by coding a signal of a line designated by the header pack in accordance with the parameter, the method comprising the steps of coding and recording the image signal into the recording area for an image signal, recording data designating a predetermined line of a copyright protection signal inserted in the predetermined line of the image signal and a parameter regarding coding of the copyright protection signal into the header pack, and recording the coded copyright protection signal into the data pack.

According to a further aspect of the present invention, there is provided a method of reproducing a digital image signal which has a recording format including a recording area for a coded image signal and another recording area for incident information, the recording area for incident information having a pack structure which includes a header pack for recording line designation data designating an arbitrary line of the image signal and a parameter regarding coding of the recording signal and a data pack for recording data obtained by coding a signal of a line designated by the header pack in accordance with the parameter, the coded image signal being recorded in the recording area for an image signal, data designating a predetermined line of a copyright protection signal inserted in the predetermined line of the image signal and a parameter regarding coding of the copyright protection signal being recorded in the header pack, the coded copyright protection signal being recorded in the data pack, the method comprising the steps of reading the coded image signal from the recording area for an image signal and decoding the read out, reading the header pack and the data pack to restore the copyright protection signal, and inserting the restored copyright protection signal into the predetermined line of the decoded image signal.

According to a still further aspect of the present invention, there is provided a recording medium on which a digital image signal is recorded, the image signal having a recording format including a recording area for a coded image signal and another recording area for incident information, the recording area for incident information having a pack structure which includes a header pack for recording line designation data designating an arbitrary line of the image signal and a parameter regarding coding of the recording signal and a data pack for recording data obtained by coding a signal of a line designated by the header pack in accordance with the parameter, the coded image signal being recorded in the recording area for an image signal, data designating a predetermined line of a copyright protection signal inserted in the predetermined line of the image signal and a parameter regarding coding of the copyright protection signal being recorded in the header pack, the coded copyright protection signal being recorded in the data pack.

In accordance with the present invention, an image signal is coded and recorded into the recording area for an image signal, and data designating a predetermined line of a copyright protection signal inserted in the predetermined line of the image signal and a parameter regarding coding of the copyright protection signal are recorded into the header pack. Further, the coded copyright protection signal is recorded into the data pack.

On the other hand, the coded image signal is read from the recording area for an image signal and decoded, and the header pack and the data pack are read to restore the copyright protection signal. Then, the restored copyright protection signal is inserted into the predetermined line of the decoded image signal.

Thus, in accordance with the present invention, a copyright protection signal inserted in a portion of a recording medium other than a portion where an actual image of an image signal is recorded such as a disturbing signal which is used by a software tape for use with an analog video tape recorder can be recorded and/or reproduced by a digital video tape recorder of the compression type.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 5(a) and 5(b) are diagrammatic views showing the structure of data on a track when APT=000;

FIG. 6 is a table showing the construction of pack data;

FIG. 13 is a table showing audio auxiliary data for 9 packs extracted and described in the direction of a track;

FIG. 14 is a diagrammatic view showing the construction of a video sector;

FIG. 15 is a diagrammatic view showing a SYNC block of the video sector;

FIGS. 19(a) and 19(b) are tables showing the construction of ID sections;

FIG. 20 is a diagrammatic view showing the construction of a sub code sector;

FIG. 21 is a diagrammatic view showing a SYNC block of the sub code sector;

FIGS. 22(a) and 22(b) are tables showing ID sections of the sub code sector;

FIG. 23 is a table showing a data section of the sub code sector;

FIG. 25 is a waveform diagram showing an example of a copyright protection signal;

FIGS. 26(a) to 26(c) are time charts illustrating the relationship between a sampling period and a sampling pulse signal;

FIG. 27 is a diagrammatic view illustrating the relationship between a quantized copyright protection signal and a video signal;

FIGS. 28(a) and 28(b) are diagrammatic views showing a line header pack and a line data pack, respectively;

FIG. 29 is a diagrammatic view showing an example of a quantized copyright protection signal stored in a line header pack and a line data pack;

FIG. 30 is a table showing an example wherein the header pack and the data pack of FIG. 29 are stored in an optional area for video auxiliary data;

FIG. 31 is a diagrammatic view illustrating an example of a form of use of the present invention on the recording side and the reproduction side;

FIG. 32 is a block diagram showing an example of the construction of a copyright protection signal detection circuit;

FIGS. 33(a) to 33(e) are time charts illustrating operation of the copyright protection signal detection circuit of FIG. 32;

FIG. 38 is a block diagram showing an example of the construction of a copyright protection signal generation circuit.

DETAILED DESCRIPTION OF THE PREFERRED EMBODIMENT

1. Characteristics of Digital Video Tape Recorder 1-1. Track Format

Figure 1:
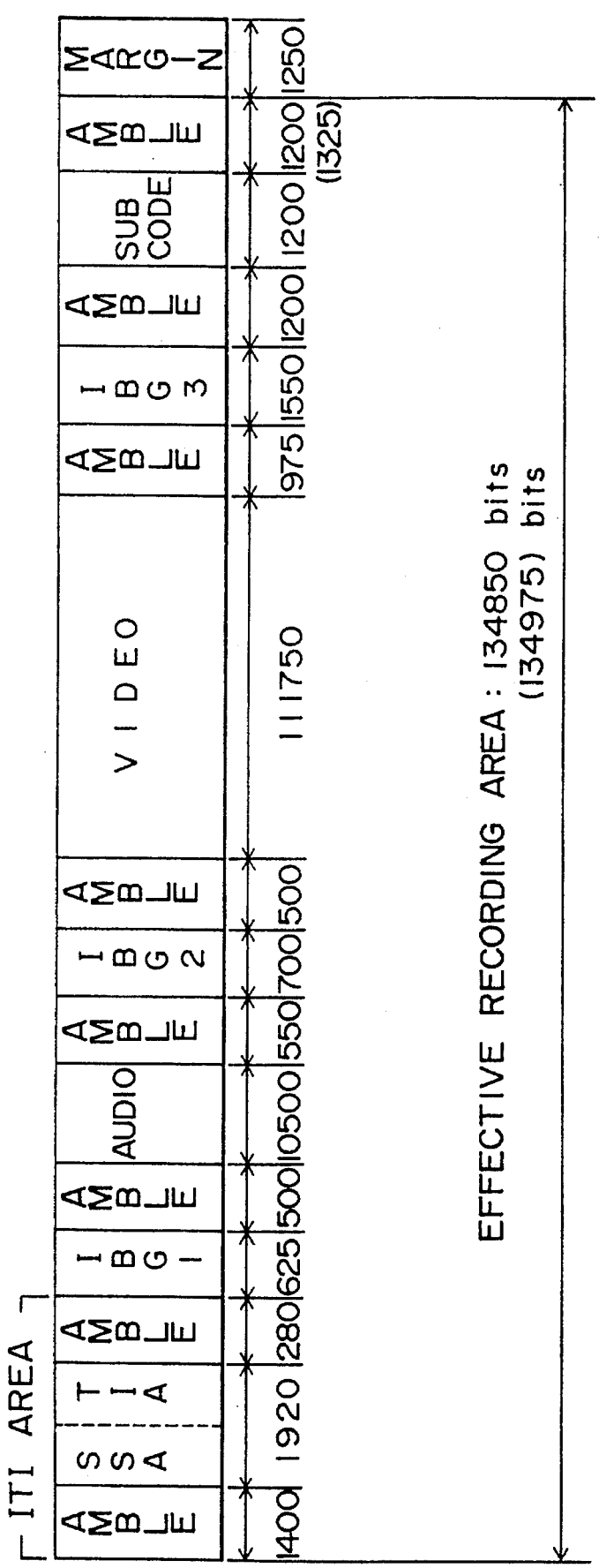
FIG. 1 is a diagrammatic view showing a track of a digital video tape recorder to which the present invention is applied.

FIG. 1 illustrates a track of a digital video tape recorder to which the present invention is applied. Referring to FIG.

1, recording on the digital video tape recorder is performed in order of an ITI (Insert and track information) area, an audio area, a video area and a sub code area from the track entrance side. It is to be noted that reference characters IBG1 to IBG3 in FIG. 1 denote each an inter-block gap. For a video signal of the 525/60 system, one frame comprises ten such tracks, and for a video signal of the 625/60 system, one frame comprises 12 such tracks.

1-2. ITI Area

The ITI (Insert and Track Information) area recorded on the track entrance side is a timing block for allowing post recording (insertion by overwriting) to be performed with certainty. In particular, the ITI area is provided to allow accurate positioning of any area following the ITI area when it is rewritten with video data or audio data by post recording. Although details will be hereinafter described, the digital video tape recorder is constructed such that it can be applied to other apparatus than recording and/or reproduction apparatus for a digital image signal and a digital audio signal by using an application ID. Since re-writing of data in a particular area is essentially required with any application apparatus, the ITI area on the track entrance side is provided without exception.

A large number of SYNC blocks with a short SYNC length are written in the ITI area, and SYNC numbers are applied to the SYNC blocks in order from the track entrance side. When it is tried to perform post recording, if any of the SYNC blocks of the ITI area is detected, then the current position on the track can be discriminated accurately from the number written therein. Then, an area for post recording is decided based on the position. Generally, on the track entrance side, a head is not contacted well and stably from the reason of the mechanical accuracy. Therefore, in the ITI area, a large number of SYNC blocks with a shorter SYNC length are written so as to raise the accuracy in detection.

Figure 2:
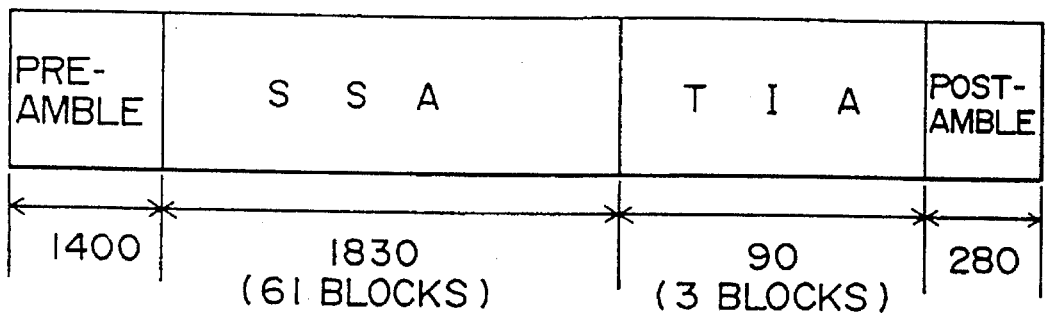
FIG. 2 is a diagrammatic view showing a more detailed construction of an ITI area of the digital video tape recorder of FIG. 1.

The ITI area includes four portions as particularly seen in FIG. 2. The ITI area first includes a preamble of 1,400 bits which are used to allow run-in of a PLL (Phase-lock loop) for reading a digital signal. It includes next an SSA (Start SYNC Block Area) for the function described above. The SSA includes 61 SYNC blocks each constituted from 30 bits. The SSA is followed by a TIA (Track Information Area). The TIA is constituted from three blocks and hence from 90 bits. The TIA is an area for storing information regarding the entire track. Each of the blocks in the TIA stores a total of 6 bits including 3 bits for an APT (Application ID of a track) which is an original application ID (details of which will be hereinafter described), 1 bit for an SP/LP representative of a track pitch, 1 bit for reservation, and 1 bit for a PF (Pilot Frame) representative of a reference frame for a servo system. The ITI finally includes 280 bits for a postamble for providing a margin.

1-3. Application ID System

The assignee of the present patent application has proposed a system called application ID which allows easy development of such digital video tape recorder to various other apparatus than recording and/or reproduction apparatus for a digital image signal and a digital audio signal (refer to U.S. patent application Ser. No. 08/159,455 filed on Nov. 30, 1993, U.S. patent application Ser. No. 08/159,238 filed on Nov. 30, 1993, and U.S. patent application Ser. No. 08/159,554 filed on Dec. 1, 1993).

Further, the assignee of the present patent application has proposed another system wherein a circuit board with a memory IC mounted thereon is carried in a cassette of a recording medium for a digital video tape recorder. When the cassette is loaded into a digital video tape recorder, data written in the memory IC are read out to assist recording and/or reproduction (refer to U.S. patent application Ser. No. 08/067,285 filed on Jun. 24, 1994 and U.S. patent application Ser. No. 08/142,813 filed on Oct. 25, 1993). In the present specification, the system will be hereinafter referred to as MIC (Memory In Cassette). The application ID system and the MIC will be described subsequently to clarify the characteristics of the digital video tape recorder to which the present invention is applied.

An application ID is stored not only in the APT of the TIA area but also in upper 3 bits at an address 0 as an APM (Application ID of MIC).

The application ID is not an ID which determines an example of application of a digital video tape recorder but an ID which merely determines the data structure of an area of a recording medium. Accordingly, the following significances are provided.

APT . . . defines the structure of data on the track

APM . . . defines the structure of data of the MIC

Figure 3:
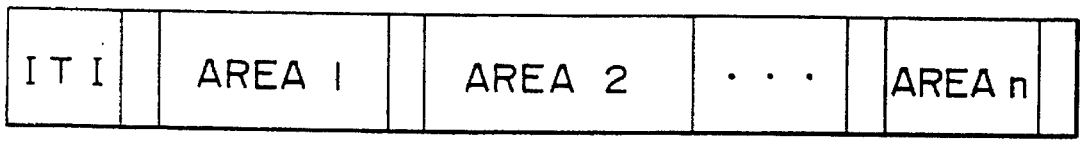
FIG. 3 is a diagrammatic view illustrating that the data structure on a track is determined by an APT.

The structure of data on the track is defined by the value of the APT. In particular, the track following the ITI area is divided into several areas as shown in FIG. 3. The data structure are determined decisively such as the positions of the areas on the track, the construction of SYNC blocks, the ECC construction for protecting data from an error and so forth. Further, each of the areas includes an application ID which defines the structure of data in the respective area. In other words, an application ID of the area (n) defines the structure of data of the area (n).

Figure 4:
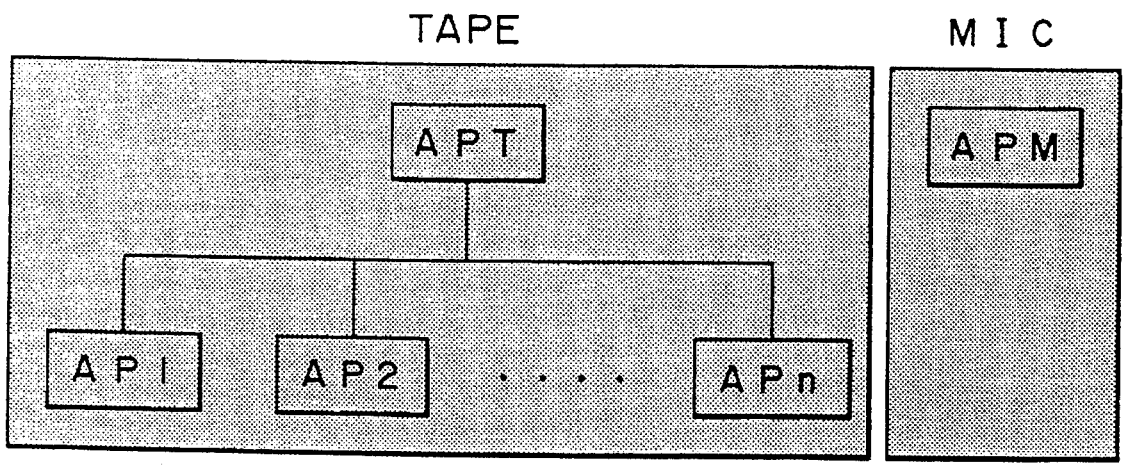
FIG. 4 is a diagrammatic view showing the structures of an application ID on a tape and an application ID of an MIC.

The application IDs on a tape have such a hierarchy as shown in FIG. 4. In particular, areas on the track are defined by the APT which is an original application ID, and AP1 to APn are defined for the individual areas. The number of areas is defined by the APT. While the application IDs are shown in double levels in FIG. 4, a further level may be provided below them if necessary. In contrast, the APM which is an application ID in the MIC is provided in a single level. An equal value to that of the APT of an application apparatus is written into the APT by a digital video tape recorder.

By using this application ID system, without modifying its cassette, mechanism, servo system or a detecting circuit of ITI area generation, etc., a digital video tape recorder for a consumer can be applicable to quite different categories of products such as, for example, data streamers or multi-track digital audio tape recorders. Further, even if an area is determined, since the contents thereof can be defined by the application ID of the area, in such a manner that the contents are video data when the application ID has a certain value, but the contents are video/audio data or computer data when the application ID has another value. It can be, therefore, developed to wide variety of products categories.

A manner of the track when the APT=000 is illustrated in FIGS. 5(a) and 5(b). In this instance, areas 1, 2 and 3 are defined on the track. Then, the positions of them on the track, the SYNC block construction, the ECC construction for protection of data from an error, a gap for assuring each adjacent areas and an overwrite margin for assuring overwriting are determined. Further, each area includes an application ID which determines the data structure of the area. In other words:

AP1 . . . determines the structure of data of the area 1;

AP2 . . . determines the structure of data of the area 2;

AP3 . . . determines the structure of data of the area 3.

Further, when the application IDs of the areas are all "000", they are defined in the following manner:

when AP1="000" ... an audio, AAUX data structure for a digital video tape recorder for a consumer is adopted;

when AP2="000" ... a video, VAUX data structure for a digital video tape recorder for a consumer is adopted;

when AP3="000" ... a sub code, ID data structure for a digital video tape recorder for a consumer is adopted. The typical example is shown in FIG. 5(b).

Here, AAUX denotes Audio Auxiliary Data, and VAUX denotes Video Auxiliary Data. When a digital video tape recorder for a consumer is realized, APT, AP1, AP2, AP3, all become "000". Of course, the APM is "000".

When APT is "000", all areas for the AAUX, VAUX, sub codes and MIC are described in a common pack structure. As shown in FIG. 6, one pack is constituted from 5 bytes, and one byte (PC0) at the top represents a header while the remaining 4 bytes (PC1 to PC4) represent data. The word "pack" denotes a minimum unit of data, and related data are collected to constitute a pack.

Figures 7, 8:
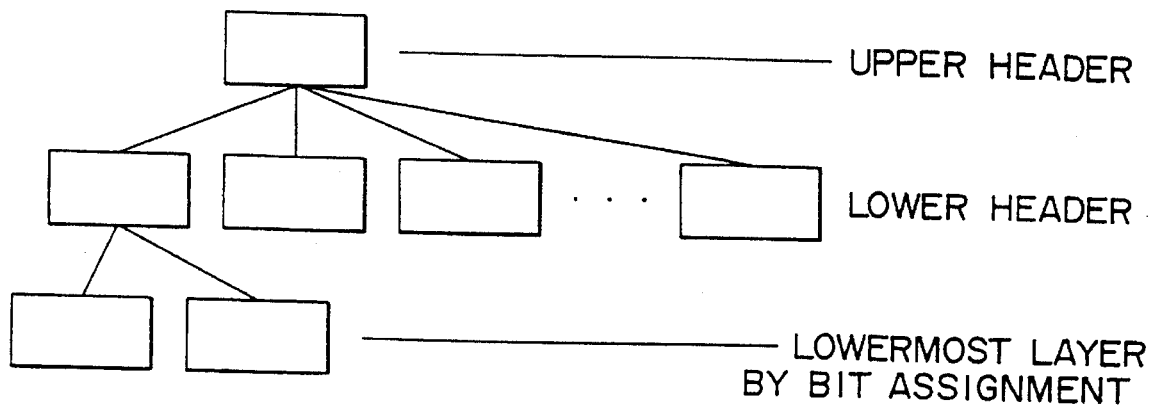
FIG. 7 is a diagrammatic view showing the hierarchy of a header.
FIG. 8 is a table showing an outline of a pack header table.

Eight bits of the header are divided into upper 4 bits and lower 4 bits and have a hierarchy. The header is constructed in double levels from an upper header of the upper 4 bits and a lower header of the lower 4 bits as shown in FIG. 7. The hierarchy can be extended to a further lower level by bit assignment of data. By such hierarchization, contents of the pack are organized precisely, and extension of the same is easy. Further, 256 spaces by the upper header and the lower header are prepared as a single pack header table together with contents of the packs. The areas mentioned above are described using the pack header table.

FIG. 8 is a diagrammatic view showing an outline of the pack header table. In the pack header table shown, the upper 4 bits are called large item while the lower 4 bits are called small item. The large item of the upper four bits is data representing, for example, an application of succeeding data. Meanwhile, the lower 4 bits are data representing, for example, detailed contents of succeeding data.

The large item can represent, as seen in FIG. 8, control by "0000", title by "0001", chapter by "0010", part "0011", program by "0100", audio auxiliary data by "0101", video auxiliary data by "0110", camera by "0111", line by "1000", and soft mode by "1111".

Here, for the large item, for example, for the audio auxiliary data "0101" and the video auxiliary data "0110", the small items are provided representing recording signal source by "0000", source control by "0001", recording date by "0010" and recording time by "0011".

Figure 9:
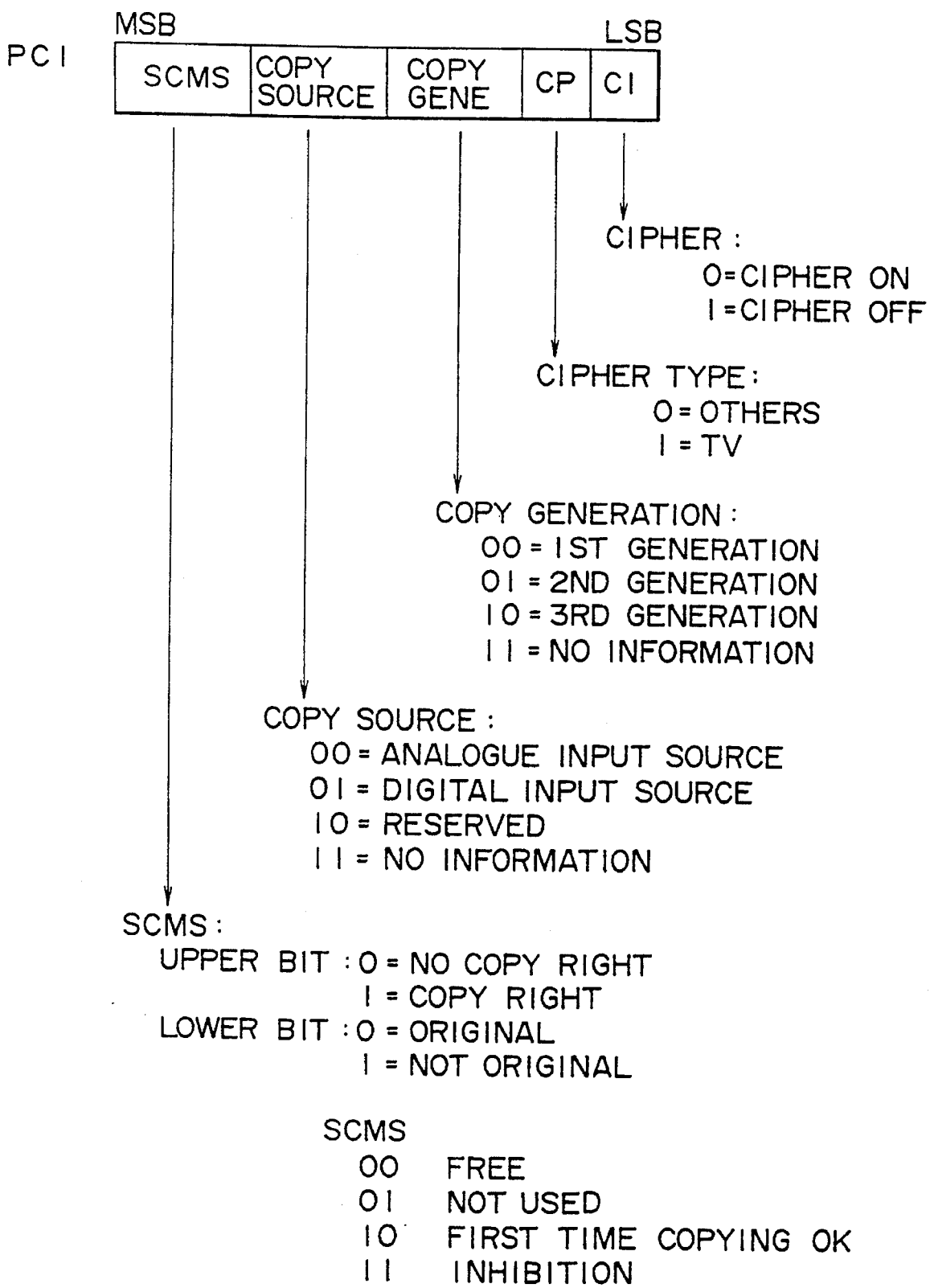
FIG. 9 is a diagrammatic view illustrating data of PC1 of a source control pack of audio auxiliary data and video auxiliary data.

FIG. 9 illustrates data of the PC1 of a source control pack of audio auxiliary data and video auxiliary data. In the pack shown, SCMS data of 2 bits, copy source data of 2 bits, copy generation data of 2 bits, cipher type data of 1 bit and cipher data of 1 bit are recorded in order from the MSB side.

With the large item for the line "1000", the small items are provided representing line header by "0000", Y by "0001", R-Y by "0010", B-Y by "0011", R by "0101", G by "0110" and B by "0111". In other words, sampling data of any line within a vertical blanking period or an effective scanning period of a television signal, or sample data of an image signal other than a television signal can be recorded with the large item for the line "1000".

It is to be noted that the large items represented by "1001" to "1110" are each left for later addition of a large item. Accordingly, recording of any new data will be allowed in future by defining a new header using the code of item data which are not yet defined (for example, one of the large items of "1001" to "1110" for future addition).

While the pack structure basically has a fixed length of 5 bytes, as a single exception, a pack structure of a variable length is used only for description of character data into the MIC. This is intended to make an effective use of the limited memory capacity.

1-4. Audio Sector

Figure 10:
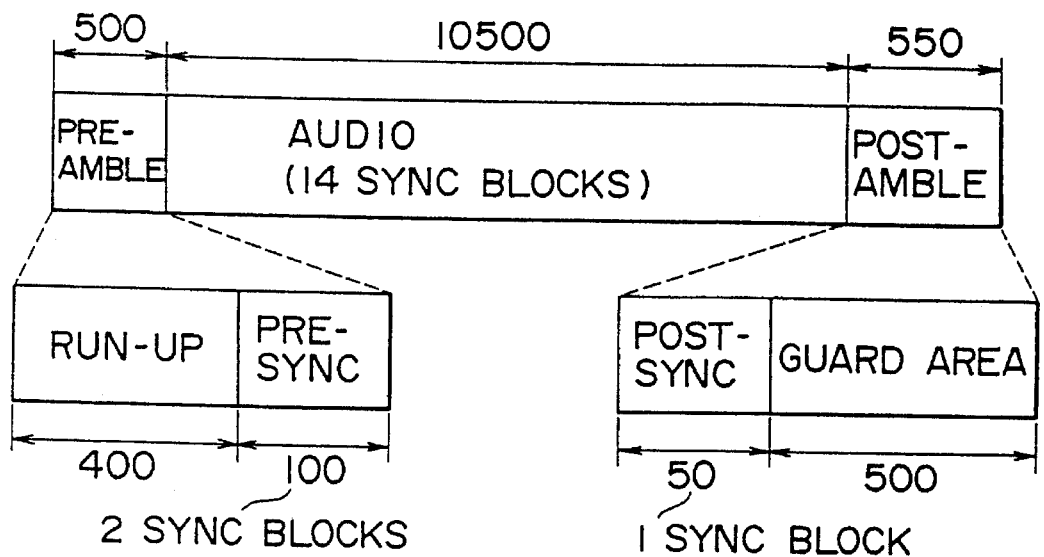
FIG. 10 is a diagrammatic view showing the construction of an audio sector.

The audio and video areas are called audio sector and video sector, respectively. FIG. 10 illustrates the construction of the audio sector. The preamble is constituted from 500 bits and includes a run-up of 400 bits and two pre-SYNC blocks. The run-up is used as a run-up pattern for pulling into a PLL. The pre-SYNC block is used for detection of an audio SYNC block in advance. The postamble at the end is constituted from 550 bits and includes a post-SYNC block and a guard area of 500 bits. The post-SYNC is provided to confirm an end of the audio sector by means of the SYNC number of ID thereof. The guard area is provided to guard so that post recording of the succeeding video sector may not invade the audio sector.

Figure 11A:
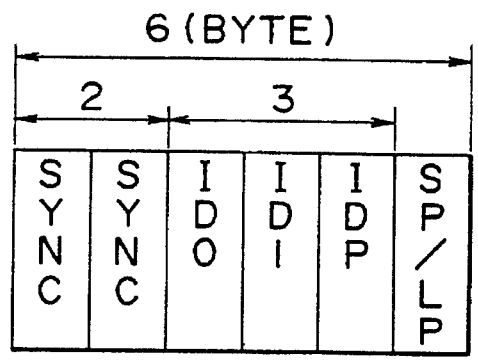
FIGS. 11(a) and 11(b) are diagrammatic views showing a pre-SYNC block and a post-SYNC block of the audio sector, respectively.
Figure 11B:
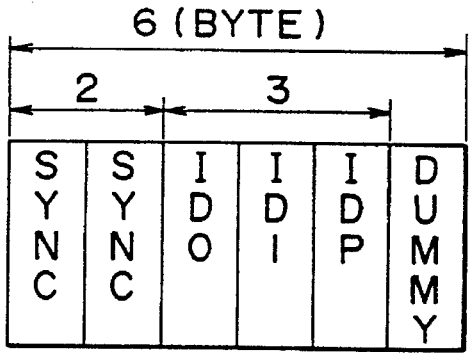

Each of the pre-SYNC and post-SYNC blocks is constituted from 6 bytes as seen from FIG. 11(a) and 11(b). The sixth byte of each pre-SYNC block has a discrimination byte between the SP/LP. The SP is represented by FFh whereas the LP is represented by 00h. The sixth byte of the post-SYNC block has FFh stored therein as dummy data.

The discrimination byte for the SP/LP is present as an SP/LP flag also in the TIA area described above, but here, it is present for protection of the SP/LP flag. If the value in the TIA area can be read, then it is adopted, but if the value cannot be read, then the value of the SP/LP discrimination byte area is adopted.

Since 6 bytes of each of the pre-SYNC and post-SYNC blocks is recorded after it is converted by 24–25 conversion (modulation method wherein data of 24 bits are converted into data of 25 bits), pre-SYNC blocks have a total bit length of 6×2×8×25÷24=100 bits and the post-SYNC block has a total bit length of 6×1×8×25÷24=50 bits.

Figure 12A:
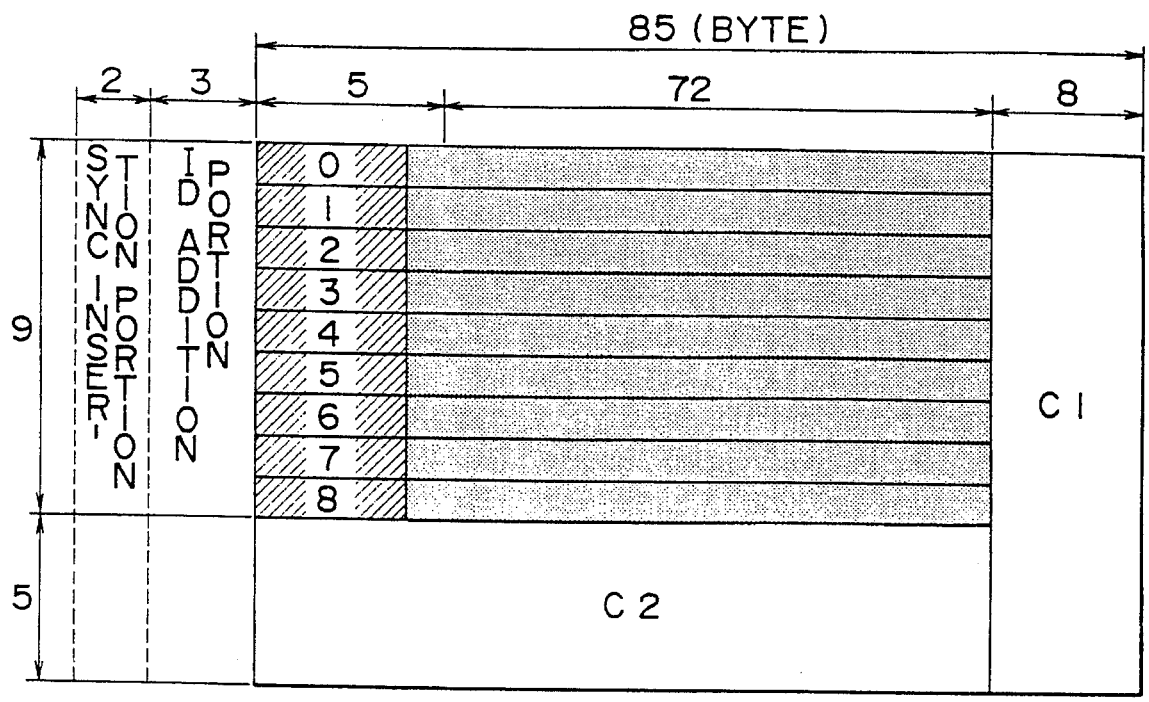
FIGS. 12(a) and 12(b) are diagrammatic views showing a SYNC block of the audio sector and a framing format, respectively.
Figure 12B:
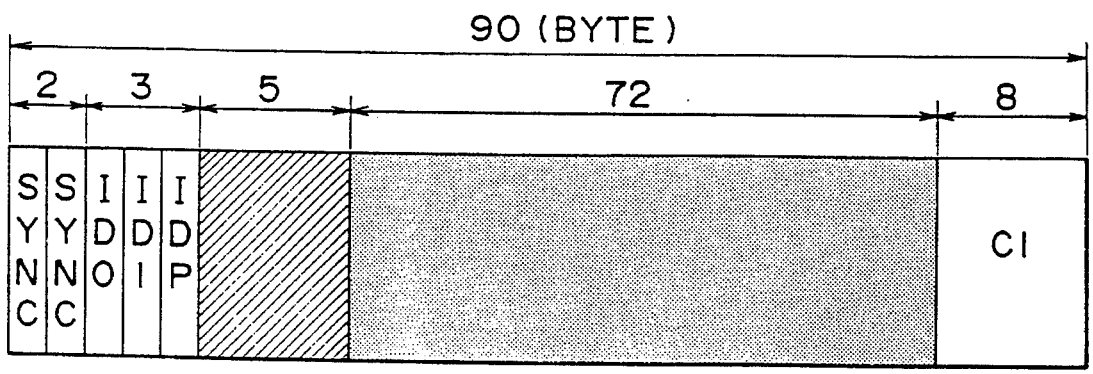

Each one SYNC block of the audio SYNC blocks is constituted from 90 bytes as seen from FIG. 12(a). The first 5 bytes of the front end have a similar construction to that of the pre-SYNC blocks or the post-SYNC block. The data section is constituted from 77 bytes and is protected by a horizontal parity C1 (8 bytes) and a vertical parity C2 (77 bytes×5).

Fourteen audio SYNC blocks are provided per one track. Since data of the audio SYNC blocks are recorded after processing by 24–25 conversion, the total bit length thereof is 90×14×8×25÷24=10,500 bits.

The second 5 bytes at the front end of data section are provided for audio auxiliary data. They constitute one pack. A total of 9 packs are prepared for one track. The numbers from 0 to 8 in FIG. 12(a) represent pack numbers in the track.

FIG. 13 is a diagrammatic view showing audio auxiliary data of nine packs extracted and described in a track direction. Here, the numbers from 50 to 55 indicate the values (in hexadecimal notation) of pack headers. The same packs are each written 10 times onto 10 tracks. This portion is called main area. Since essential items such as a sampling frequency and a quantization bit number necessary for reproduction of an audio signal are mainly stored here, they are repeatedly written for protection of the data. Consequently, data in the main area can be reproduced irrespective of a lateral scratch or a one-channel clog or the like which is likely caused by tape transportation.

The remaining packs are all linked in an order and used as an optional area. Packs in the main area are linked, skipping like a, b, c, d, e, f, g, h, . . . , in the direction indicated by an arrow mark in FIG. 13. Within one video frame, 30 packs (525/60 system) or 36 packs (625/50 system) are prepared as the optional area. Here, since the optional area literally means an option, it may be selected freely from the pack header table of FIG. 8, respectively for each digital video tape recorder.

The optional area may be constituted from a common option (for example, character data) and a maker's option which is not common, whose contents are predetermined uniquely by a manufacturer's choice. Since the common option and the maker's option are options, only one or both or none of them may be provided. Where no information is present, this is described using a pack "NO INFO pack" representing absence of information. The areas for the application IDs and for the options are divided by appearance of a maker code pack. The area following the maker code pack is a maker's optional area.

The mechanism of the main area, the optional area, the common option and the maker's option is all common to the audio auxiliary data, the video auxiliary data, the sub codes and the MIC.

1-5. Video Sector

FIG. 14 shows the construction of the video sector. The constructions of the preamble and the postamble are same as those of the audio sector of FIG. 10. The amount of the guard area of the postamble is greater than that of the audio sector.

Figure 16:
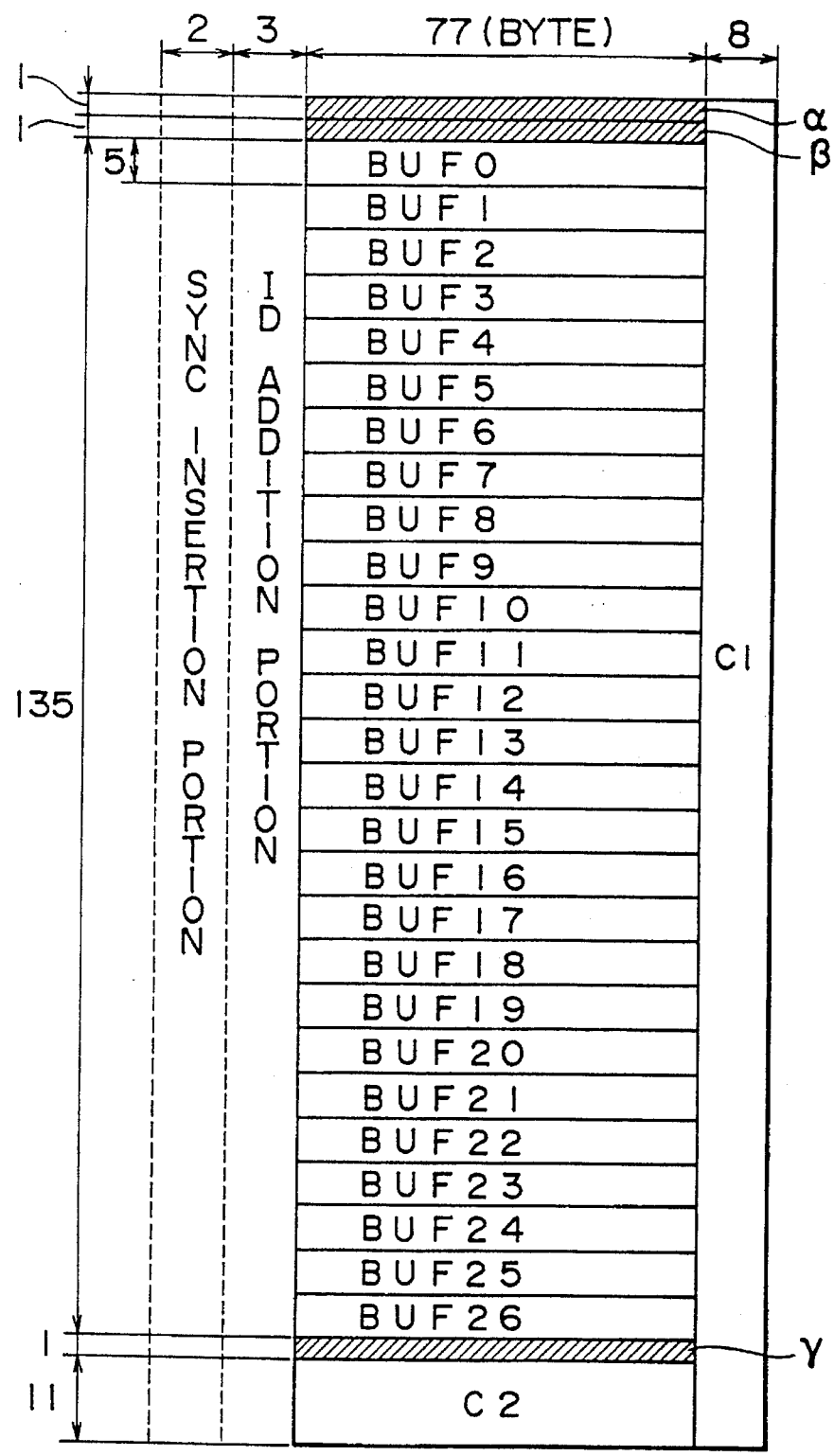
FIG. 16 is a diagrammatic view showing a framing format of the video sector.

Each of the video SYNC blocks is constituted from 90 bytes similarly to the audio SYNC blocks as seen from FIG. 15. The first 5 bytes at the front end have a similar construction to that of the pre-SYNC, post SYNC and audio SYNC blocks. The data section is constituted from 77 bytes and is protected by a horizontal parity C1 (8 bytes) and a vertical parity C2 (77 bytes×11) as seen in FIG. 16. Two SYNC blocks (α and β) at an upper portion in FIG. 16 and one SYNC block (γ) just prior to the C2 parity are SYNC blocks for exclusive use for the VAUX, and the respective data of 77 bytes are used as video auxiliary data. In the video SYNC blocks other than the SYNC blocks for exclusive use for the VAUX and the C2 parity SYNC block, video data of a video signal are stored, being compressed by DCT (Discrete Cosine Transform).

In FIG. 16, the central 135 SYNC blocks make a storage area for video data. While numbers from BUF0 to BUF26 appear in FIG. 16, BUF denotes one buffering block. One buffering block is constituted from 5 SYNC blocks and one track is constituted from 27 buffering blocks, and consequently, one video frame which is constituted from 10 tracks is constituted from 270 buffering blocks.

An area effective for an image are extracted out of image data of one frame and the thus sampled digital data are shuffled and collected from various portions of an actual image to make up a group of 270 data. Such one group makes one buffering unit. The data are compressed for each unit using a compression technique which employs the DCT method or the like. This processing is performed while evaluating whether or not the entire data remain within a desired compression value. Thereafter, the compressed data of one buffering unit are packed into one buffering block and 5 SYNC blocks.

Figure 17:
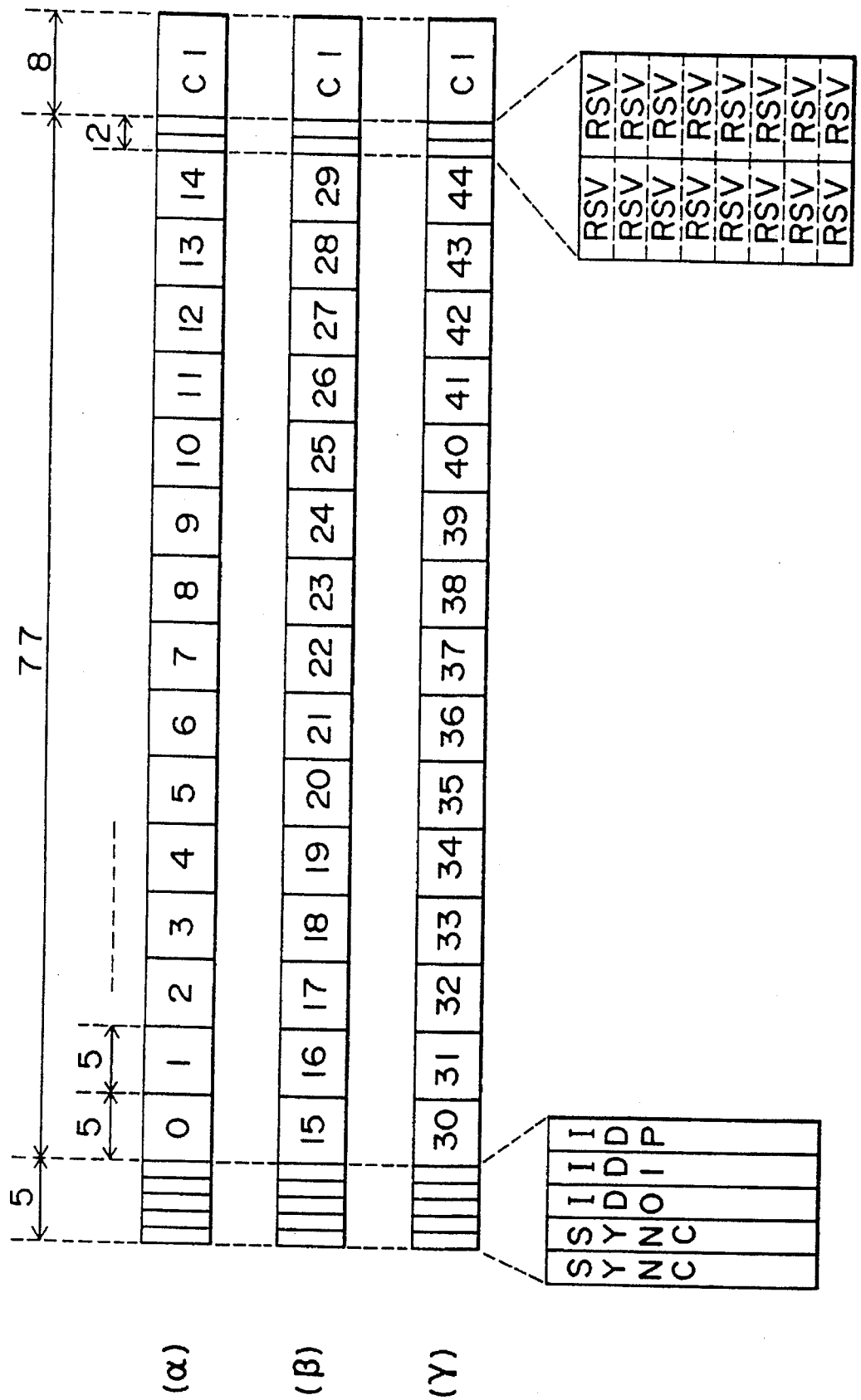
FIG. 17 is a diagrammatic view showing a SYNC block for exclusive use for video auxiliary data.

FIG. 17 illustrates the construction of SYNC blocks for exclusive use for the VAUX. Two SYNC blocks (α) and (β) at an upper portion of FIG. 16 corresponds to the two SYNC blocks (α) and (β) at an upper portion of FIG. 17, and one SYNC block (γ) just prior to C2 in FIG. 16 corresponds to the lowermost SYNC block (γ) in FIG. 17. If the 77 bytes are divided by a unit of a pack of 5 bytes, then 2 bytes remain, and such remaining two bytes are reserved and not used particularly. If the packs are numbered similarly to the packs of audio data, then a total of 45 packs from 0 to 44 are assured for one track.

Figure 18:
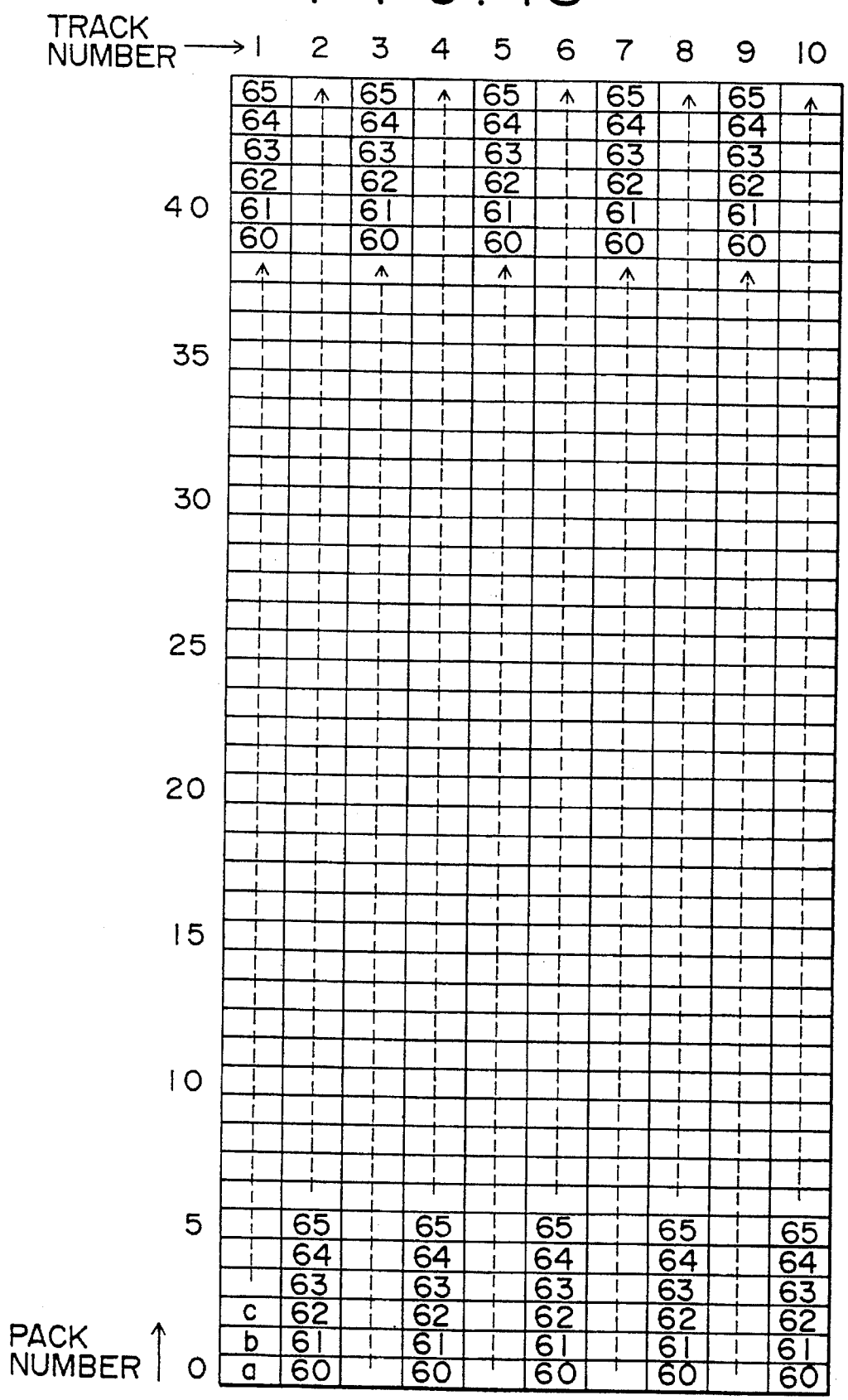
FIG. 18 is a table illustrating video auxiliary data for 45 packs extracted and described in the direction of a track.

FIG. 18 shows video auxiliary data for 45 packs extracted and described in a track direction. Here, the numbers from 60 to 65 indicate the values (in hexadecimal notation) of pack headers. This portion makes a main area. Same pack are written by 10 times onto 10 tracks similarly as audio auxiliary data. Essential items are mainly stored here, such as a television system and an aspect ratio of the screen necessary for reproduction of the video signal. Consequently, data in the main area can be reproduced irrespective of a lateral scratch or a one-channel clog or the like which is likely caused by tape transportation.

The remaining packs are all linked in an order and used as an optional area. Packs in the main area are linked, skipping like a, b, c, . . . , in the direction indicated by an arrow mark in FIG. 18. Within one video frame, 390 packs (525/60 system) or 468 packs (625/50 system) are prepared as the optional area. Here, the optional area is handled in a similar manner to the optional area for audio data.

The video SYNC blocks consist of 149 SYNC blocks per a single track. Since the video data in the video SYNC tracks are recorded after they are processed by 24–25 conversion, the total bit length of them is 90×149×8×25÷24=111,750 bits.

Subsequently, the ID section will be described. The IDP is a parity for protecting the ID0 and the ID1, utilizing with the same system in the sectors as audio and video data and sub codes. Contents of the ID section are illustrated in FIGS. 19(a) and 19(b), but the IDP is omitted in those figures.

First, the ID1 is a location for storing SYNC numbers in the track. Numbers from 0 to 168 are consecutively applied in binary notation to the blocks from the pre-SYNC block of the audio sector to the post-SYNC block of the video sector.

The lower 4 bits of the ID0 accommodates a track number in the video frame. A number is assigned per every two tracks. Then, the distinction between such two tracks can be made based on the azimuth angle of a head. The upper 4 bits of the ID0 have different contents depending upon the location of the SYNC block. In the case of a SYNC block of the AAUX+audio data and a SYNC block of video data illustrated in FIG. 19(b), the upper 4 bits of the ID0 accommodate 4 bits of a sequence number. This may have 12 different numbers from 0000 to 1011, assigned for each one video frame. From the upper 4 bits of the ID0, it can be distinguished whether data obtained upon variable speed playback belong to a same frame. In the case of a pre-SYNC block and a post-SYNC block as well as a SYNC parity for a C2 parity of FIGS. 10, 12(a) and 12(b), 14 and 16, the application ID, the AP1 and the AP2 are stored in the upper 3 bits of the ID0 as seen in FIG. 19(a). Accordingly, the AP1 is written by 8 times and the AP2 is written by 14 times. By repeatedly writing the AP1 and the AP2 by and dispersing the storage locations of them in this manner, it is intended to improve the reliability and protection of an application ID.

1-6. Sub Code Sector

FIG. 20 shows the construction of the sub code sector. Unlike the audio or video sector, the preamble and the postamble do not include a pre-SYNC block or a post-SYNC block. Further, they have greater lengths than those of the other sectors. Since the sub code sector is used for frequent rewriting of an index or the like and is located at the last end of the track, all offsets in the former half of the track are accommodated in an accumulated condition.

A sub code SYNC block is constituted from 12 bytes as seen in FIG. 21. The first five bytes of the front end are constructed in a similar manner as those of a pre-SYNC block, a post-SYNC block, an audio SYNC block or a video SYNC block. The succeeding data section is constituted from 5 bytes and by itself constitutes a pack. The horizontal parity C1 for protection of the data section is constituted from 2 bytes. The horizontal parity C1 does not have a product code construction by C1 and C2 like the audio sector or the video sector. This is because sub codes are provided mainly for high speed searching and there is no possibility that they may be picked up together with the C2 parity within the limited envelope. Further, in order to allow high speed searching up to approximately the speed of 200 times, the SYNC length of the sub code SYNC block becomes short to 12 blocks.

The sub code SYNC blocks consist of 12 SYNC blocks per a single track. Since sub code data are recorded after they are processed by 24–25 conversion, the total bit length thereof is $12 \times 12 \times 8 \times 25 \div 24 = 1,200$ bits.

FIGS. 22($a$) or 22($b$) shows the ID sections of a sub code SYNC block. The contents of data sections in the sub code sector at the 5 tracks (525/60 system) or 6 tracks (625/50 system) in the front end are different from those in the rear end. An F/R (Front/Rear) flag is present at the MSB of the ID0 in order to allow distinction between the front end and the rear end upon variable speed playback or upon high speed searching. In the succeeding three bits, the application ID, AP3 is accommodated at the SYNC number of 0 and 6 as shown in FIG. 22($a$). When the SYNC number is any other than 0 and 6, INDEX ID, SKIP ID and PP ID (Photo Picture ID) are stored in order from the upper side as shown in FIG. 22($b$). The INDEX ID is provided for index searching, and the SKIP ID is provided for cutting an unnecessary scene such as advertisement. The PP ID is provided for searching a still picture. An absolute track number extends between the ID0 and the ID1. The tracks are assigned by absolute numbers in order from the top of the tape, and the MIC performs TOC (Table Of Contents) searching and so forth based on such absolute track number. The lower 4 bits of the ID1 represent a SYNC block number in the track.

FIG. 23 shows the data section of a sub code block. Each alphabetical character of a capital letter represents a main area, and each alphabetical character of a small letter represents an optional area. Since one SYNC block for sub codes has one pack, the pack number within one track becomes 12 from 0 to 11. A same character represents same pack contents. Contents are different between the front end and the rear end.

In a main area, information necessary for high speed searching such as a time code and a recording date is stored. Since high speed searching of sub code data can be performed in units of a pack, it is particularly called pack searching.

It is impossible to link and use all of the optional areas like the AAUX or the VAUX. Since only the C1 parity of 2 bytes is provided as described above and accordingly the protection of the parity is weak, the contents are distributed upwardly and downwardly for each track and same data are overwritten repeatedly in the front and rear ends of the same track so as to protect them. Accordingly, only 6 packs in the front and rear halves can be used for an optional area. This is common between the 525/60 system and the 625/50 system.

1-7. Data Structure of MIC

Figure 24:
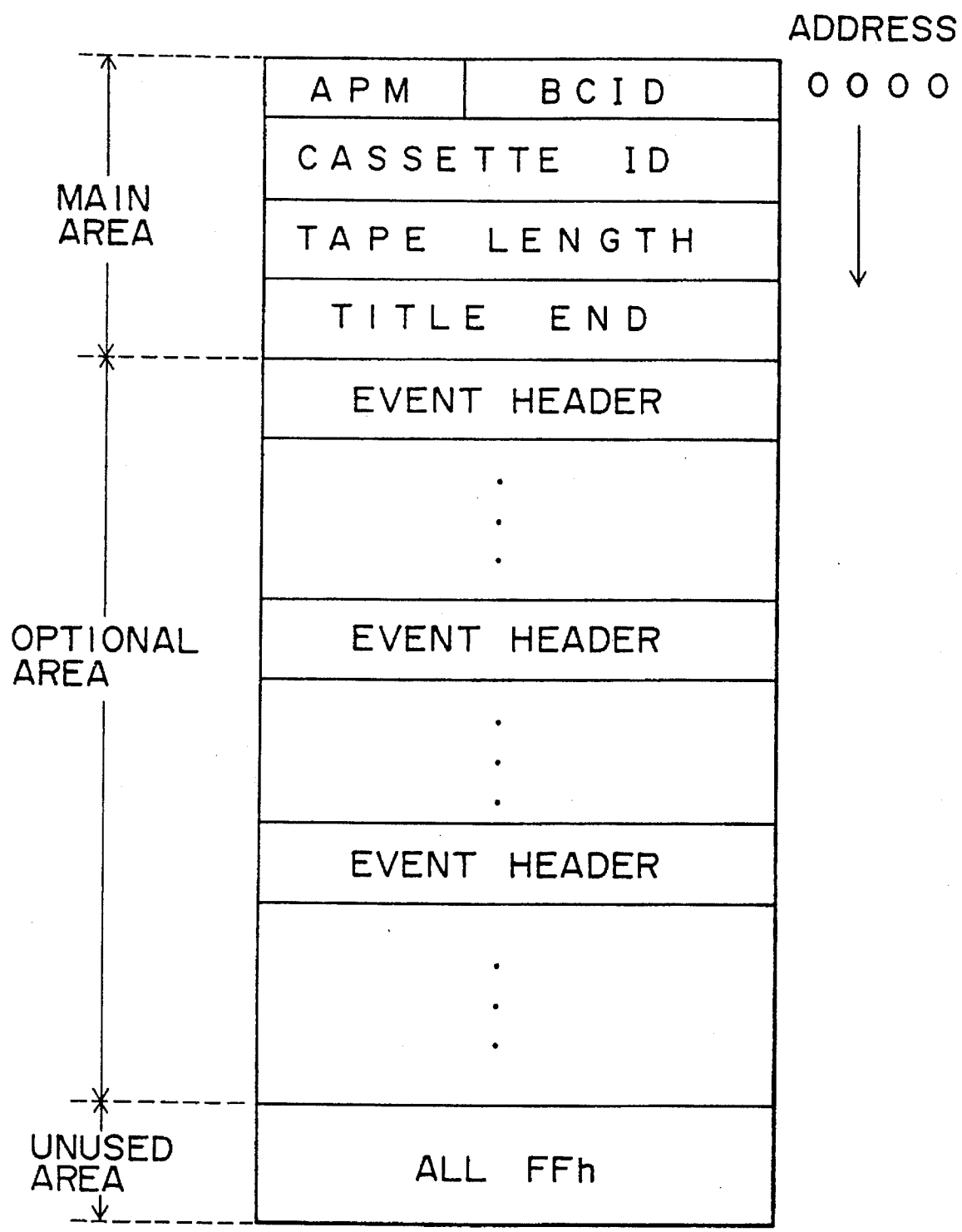
FIG. 24 is a diagrammatic view showing the structure of data of the MIC.

FIG. 24 shows the data structure of the MIC. Also the inside of the MIC is divided into a main area and an optional area and data are all described in a pack structure except one byte at the top and an unused area (FFh). As described above, only character data are stored in a pack structure with a variable length, and any other data are stored in a pack structure with a fixed length of 5 bytes same as that for VAUX, AAUX and sub codes.

The MIC main area accommodates, at the top address 0 thereof, 3 bits of the application ID, APM of the MIC and 4 bits of the BCID (Basic Cassette ID). The BCID is a basic cassette ID and has the same contents as those of an ID board for ID recognition (tape thickness, tape type, tape grade) for a cassette without an MIC. The ID board has MIC reading terminals which play the same role as recognition holes of a conventional 8 mm video tape recorder. This eliminates the necessity for perforation of a cassette half as in the prior art.

Three packs of CASSETTE ID, TAPE LENGTH and TITLE END are accommodated in order beginning with the address 1. The CASSETTE ID pack accommodates detailed value of the thickness of the tape and memory information regarding the MIC. The TAPE LENGTH pack is used for a tape manufacturer to store the tape length of the cassette by the expression of a number of tracks. The remaining amount of the tape can be calculated immediately from the TAPE LENGTH pack and the succeeding TITLE END pack (recorded by an absolute track number) as a recorded last position information position information. Further, this last position information provides a convenient manner of use when an original last position is to be restored after playing back an intermediate portion of the tape by a camcoder and then stopping it, or when a timer recording is set up.

The optional area is constituted from optional events. While the main area has a fixed area of 16 bytes from the address 0 to the address 15, the optional area has a variable area beginning with the address 16. The length of the area varies depending upon the contents. When an event is to be deleted, the remaining events are stored in a packed condition into the area beginning with the address 16. After the packing operation, the unnecessary data are all written into the unused area of FFh. The optional area is a literary optional area, and it stores TOC (Table Of Contents) information, tag information representing a point (for example, a point at which still reproduction is performed) on the tape, character information representing the title of the program and so forth.

Upon reading out of the MIC, a next pack header appears for each 5 bytes or variable length bytes (character data) depending upon contents of the pack header thereof. However, if FFh in the unused area is read out as a header, the microcomputer can detect that there is no information succeeding the header of FFh because of the FFh corresponding to a pack header for a no-information pack (NO INFO pack).

2. Recording/Reproduction of Copyright Protection Signal 2-1. Outline of Copyright Protection Signal Now, an example of a copyright protection signal in accordance with the present invention is illustrated in FIG. 25. Pseudo H (Horizontal) Sync pulses a, b, c, d and e are inserted to positions, at which no H Sync pulse must be present originally, as seen in FIG. 25, so that a servo circuit of a dubbing side video tape recorder may be disturbed. Simultaneously, a pulse signal called AGC (Auto Gain Control) pulses f, g, h, i and j is inserted. This will cause an analog variation in level and provides a case (pulsing mode) wherein the signal varies between two certain levels like pulses, another case called stationary mode wherein the signal is stationary at the maximum level of 129 IRE or the pedestal level of 12 IRE, and so forth. Reference numeral k denotes what is called White Reference and is fixed at 119 IRE. However, also here, in some cases, the value k varies to 119 IRE or the pedestal level of 12 IRE. As a result of the operation, the recording signal level of a dubbing side video tape recorder is deviated from about 30% to about 70% of an ordinary signal level, and consequently, correct recording cannot be performed.

2-2. Sampling and Quantization of Copyright Protection Signal

Subsequently, processing of sampling and digitizing the copyright protection signal and packing it into a pack structure will be described.

First, as for the sampling frequency, since the pseudo SYNC front porch of FIG. 25 has a minimum width, in order to reproduce this, a frequency higher than $1 \div (1.8 \times 10-6 \div 2) = 1.111$ MHz is required from the sampling theorem.

The following (a) to (d) are available as a sampling frequency which satisfies the requirement described just above and is close to 1.11 MHz:

(a) 72 fH=1.13 MHz (b) 858 fH/10=1.35 MHz (c) 858 fH count down=13.5 MHz (burst)

(d) 3×32 fH=1.51 MHz

Here, fH denotes a horizontal synchronizing signal frequency that is 15.734 kHz in the case of the 525/60 system. Meanwhile, 858 fH is a sampling frequency 13.5 MHz of a video signal of a digital video tape recorder as seen from FIG. 39. Further, 32 fH is a frequency which is employed in a closed caption for a viewer who is hard of hearing, which has been already enacted in the United States of America.

The frequency of the item (a) has a multiple of fH by an integral number and is a minimum frequency which satisfies the requirement described above. Though it is locked with fH, a new PLL circuit is required. While a ⅒ frequency dividing circuit is required for the frequency 858 fH/10 of the item (b), the sample number per one line is 85.8 and has a fraction. The count down of 858 fH of the item (c) is a system wherein a sampling clock signal (locked with fH) of 13.5 MHz of the source is counted down and a clock signal of 1.35 MHz is generated when a predetermined sampling position is reached. While this requires a decoder for counting down, since the phase is not shifted and the circuit is simple and precise, this is adopted in the present embodiment.

Subsequently, the following e to g are available as a period for which the copyright protection signal shown in FIG. 25 is to be sampled.

(e) 720/858 of one line (f) for 35.7 μsec (g) for 58.2 μsec

Figure 39:
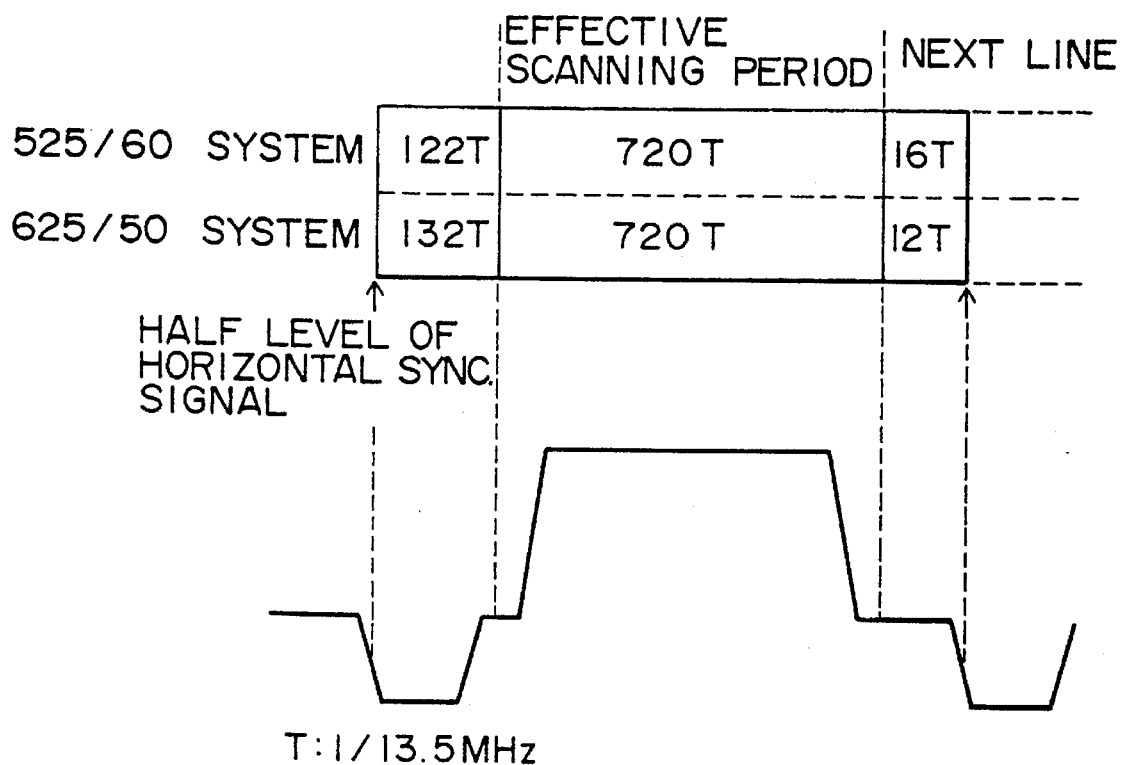
FIG. 39 is a waveform diagram illustrating an effective scanning period of a digital video tape recorder.

As apparently seen from FIG. 39, the portion of the item (e) is an effective area adopted by a digital video tape recorder, which makes 720 samples effective out of 858 samples of one line. In this instance, the effective sampling position is determined from the trailing edge of a horizontal synchronizing signal (H. SYNC). In the case of the item (f), the pseudo SYNC signals "a" to "e" are sampled, but the White Reference is not sampled. In the case of the item (g), sampling is performed up to the White Reference. In the present embodiment, the item (e) is adopted. The reason is that this is the same as an effective area for a video signal adopted by a digital video tape recorder and time setting of the item (f) or (g) is in an analog fashion and not definite.

FIGS. 26(a) to 26(c) illustrate the relationship between sampling periods and sampling pulses. The sampling position is shown for both of the 525/60 system (NTSC) and the 625/50 system (PAL and SECAM). As described above, this is a specification itself for a digital video tape recorder. Sampling clocks are generated by 72 from a predetermined sampling position as seen from the waveforms of FIGS. 26(b) and 26(c). The duty is optimum at 50% of 5 T of the High period and 5 T of the Low period.

Subsequently, the quantization number for samples will be described. From the nature of the signal in FIG. 25, one half of the quantization number of 8 bits of a video signal, that is 4 bits, is enough. 2 bits are insufficient, but 3, 5, 6 or 7 bits are not suitable with a digital video tape recorder which processes data in units of 8 bits. Therefore, quantization of 4 bits is adopted in the present embodiment.

FIG. 27 illustrates a method of matching data of a copyright protection signal sampled and quantized with a video signal. In particular, in order to match 4-bit data with 8 bits of a video signal, 0000 is added as the lower 4 bits to the data of the copyright protection signal to make up 8-bit data. The digital levels are described at an intermediate column in FIG. 27. Further, on the right side in FIG. 27, analog levels of a brightness signal from 0 IRE to 100 IRE are shown in contrast with digital levels. On the further right side, digital values are shown of the pedestal level (black level) and the white level. It can be seen that the pedestal level is obtained by adding 0000 as the lower 4 bits to the 4-bit data 0001 to make up 8-bit data.

By the way, the pseudo SYNC chips a, b, c, d and e in FIG. 25 do not vary their level. In other words, levels between the pedestal level and the SYNC chips need not be reproduced finely. Therefore, in the present embodiment, the SYNC chip level is represented by 4-bit data 0000 and the levels above the pedestal level are represented by the remaining 15 levels from 0001 to 1111. This allows fine representation above the pedestal level. In contrast, if all of the levels are quantized uniformly, then a digital value will be applied to an insignificant level, resulting in rough representations above the pedestal level.

By the way, a value obtained by adding 0000 as the lower 4 bits to the 4-bit data 1111 to make 8-bit data does not allow reproduction up to 129 IRE in FIG. 25. Since FIGS. 26(a) to 26(c) represent the specification of a digital video tape recorder itself, digital composition may involve reproduction up to 110 IRE to the utmost, but this does not cause a trouble to the function of copyright protection. Further, when analog composition is performed, the level can be raised to 129 IRE by a circuit, and accordingly, there is no problem.

2-3. Packing

A line pack will be described subsequently, into which data thus obtained are to be stored. As described in the foregoing description of FIG. 8, as line packs for storing line data, there are one kind of line header pack (pack header 80h) and six kinds of line data packs (for Y: pack header 81h; for R-Y: pack header 82h; for B-Y: pack header 83h; for R: pack header 85h; for G: pack header 86h; and for B: pack header 87h).

The line data packs for Y, R-Y and B-Y are prepared for component signals of a digital video tape recorder to which the present invention is applied, and the line data packs for R, G and B are prepared for an application such as for a computer. Since only the Y component is sufficient for reproduction of the copyright protection signal of FIG. 25, the data pack for Y is employed.

Regarding a storage area for the data pack for Y, since an original copyright protection signal is inserted in a vertical blanking period of a video signal, it is determined that the data pack for Y is stored in the optional area for VAUX of FIG. 18. As to an order of storage, a line header pack, a predetermined number of the line data packs for Y, a line header pack and a predetermined number of the line data packs for Y are stored in units of each single line.

FIG. 28(*a*) illustrates the line header pack, and FIG. 28(*b*) illustrates the line data pack for Y. Data to be stored into the line header pack of FIG. 28(*a*) have the following significances:

LINES: line number to be stored (1 to 1,250); stored in binary number
  B/W: white/black or color? 0: white/black, 1: color (normal)
  EN: Is CLF effective? 0: effective, 1: ineffective
  CLF: color frame number
  CM: common data to first and second fields? 0: common, 1: independent
  TDS: total sample number
  QU: quantization bit number 00: 2 bits, 01: 4 bits, 10: 8 bits, 11: undefined
  SAMP: sampling frequency 000: 13.5 MHz, 001: 27.0 MHz, 010: 6.75 MHz, 011: 1.35 MHz, 100: 74.25 MHz, 101: 37.125 MHz, others: undefined Here, the B/W, EN and CLF are provided for commercial use and are not used for a software tape for a consumer, particularly for a software tape on which a copyright protection signal of the present application is recorded. These four bits become 1111.

Referring subsequently to FIG. 28(*b*), the Y pack comprises PC0 which stores 81*h* for recognizing the pack is a Y pack and PC1 to PC4 for individually storing data of 8 bits. Accordingly, one data pack for Y can store data of 32 bits, that is, data for 8 samples.

By the way, there are two methods of representing line numbers of a video signal. According to one of the methods, lines are represented through the first and second fields (for example, in the case of the NTSC, first to 525th lines). According to the other method, lines are represented separately in the first field and the second field (for example, the line 21 of the first field, the line 11 of the second field). Then, the CM flag is effective in such an application wherein data stored in a line data pack have common positions and common contents between the first field and the second field.

For example, if CM=0 and LINES=10 are stored into the line header pack, then by subsequently storing a line data pack in which data common to the first and second fields are stored, necessary data can be recorded with a data pack of a size equal to one half of a data pack in which data of the first field and data of the second field are stored individually. Incidentally, the line 10 of the second field is the line 273 by the through-number representation.

TDS indicates up to which actual position data are stored in the data storage area of the line data pack. All 1 having a meaning of absence of information is written in the remainder of storage area. In the present embodiment, since quantization is performed in 4 bits and 72 samples are obtained per one line, the data are just stored in nine packs and do not generate any reminder.

The CM flag described above can be used effectively for the copyright protection signal since, where the first and second fields are compared, the copyright protection signal is positioned at the same position and has the same, contents. The copyright protection signal is stored somewhere in the 12th to 20th and 275th to 283rd horizontal lines. Since it has the length corresponding to 8 lines with almost all analog video tapes, here in the present embodiment, the copyright protection signal is stored for 8 lines. It is to be noted that, since a pack structure is employed, the storage line number for the coryright protection signal can be increased or decreased readily, if necessary.

FIG. 29 illustrates an example of actual storage of data. Here, it is presumed that the copyright protection signal is stored in the lines 13 to 20 of the first and second fields. Since the storage line numbers can be designated by the LINES stored in the PC1 of the line header pack, the storage lines need not be successive. As seen from FIG. 29, line data are packed in order of the lower 4 bits and the upper 4 bits.

FIG. 30 illustrates an example wherein the header pack and the data pack of FIG. 29 are stored in the optional area for video auxiliary data of FIG. 18. In this manner, it can be seen that, in the present embodiment, the pack of the copyright protection signal can be accommodated in one video frame.

2-4. Recording/Reproduction System

Subsequently, examples of circuits of the recording side and the playback side of the present invention will be described. First, a flow of line pack data in recording and playback will be described with reference to FIG. 31.

In a print house, a copyright protection signal is inserted into a vertical blanking period of an analog video signal A out of other signals to be recorded onto a software tape, using a conventional copyright protection signal generator 1. Then, the analog video signal B, into which the copyright protection signal has been inserted, is delivered to a format converter 2 for converting the format of the analog video signal B into a recording format for a digital video tape recorder. In addition to an analog or digital audio signal, a line data signal generator 3 of the present invention is connected to the format converter 2. The copyright protection signal of FIG. 25 is extracted by the line data signal generator 3. The extracted signal is converted into the format of FIG. 30, and then stored into the optional area for VAUX of a digital software tape 4.

A digital video tape recorder 5 detects, upon playback, the line pack data stored in the optional area for VAUX of the digital software tape 4. The copyright protection signal is decoded and inserted into a predetermined line. The analog video signal E is thus reproduced.

2-4-1. Recording System

Subsequently, an example of the circuit of the line data signal generator 3 of FIG. 31 will be described. Since the line data signal generator 3 is basically constructed such that it detects whether or not a copyright protection signal is inserted in a vertical blanking period of a video signal and, when a copyright protection signal is detected, it samples and stores the copyright protection signal into a data pack. A copyright protection signal detection circuit in the line data signal generator 3 will be described first.

FIG. 32 is a block diagram showing the construction of the copyright protection signal detection circuit. FIGS. 33(*a*) to 33(*e*) are time respectively illustrate waveforms of signals at the locations (a) to (e) in FIG. 32. Further, the signal "a" is a signal of an analog level, and the other signals are signals of a digital level.

The analog composite video signal (a) is clamped at a fixed value in terms of the DC component of the pedestal by a pedestal clamp circuit 33 and is then applied to a SYNC chip level slice circuit 34. The SYNC chip level slice circuit 34 extracts portions of SYNC chips to make the signal (d) of the digital level. Meanwhile, the horizontal synchronizing pulse signal (b) extracted from the composite video signal (a) is converted into the signal having such a waveform as shown by the waveform in FIG. 33(*c*) by a monostable multivibrator 31 and then supplied to a gate circuit 32. Then, the signal (c) from the monostable multivibrator 31 is gated by the signal d outputted from the SYNC chip level slice circuit 34 so that the signal (e) out of the gate circuit 32 can be supplied to a counter 35. Since the counter 35 is cleared by a leading edge of the horizontal synchronizing signal, the counter 35 counts the number of pseudo SYNC pulses of FIG. 25 for each one line. The output of the counter 35 is supplied to a comparator 36. Since, for example, "3" is inputted as a comparison value to the comparator 36, the comparator 36 outputs a detection signal when the output of the counter 35 changes to 3. The comparator 36 is provided in order to prevent a count error caused by noise and determines presence of a copyright protection signal only when a copyright protection signal is counted by three or more times.

Figure 34:
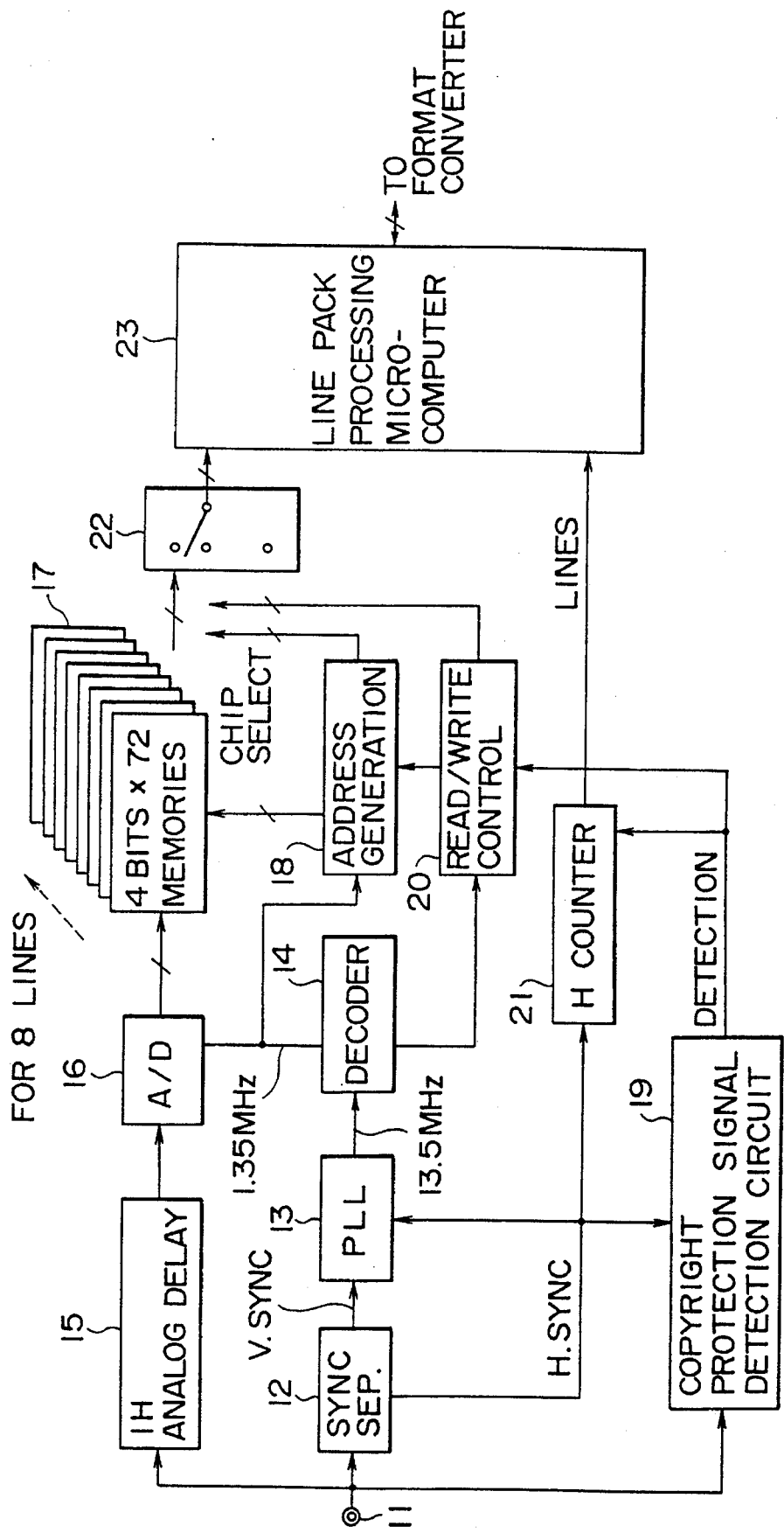
FIG. 34 is a block diagram showing an example of the construction of a line data signal generator.

FIG. 34 shows an example of the circuit of the line data signal generator. An analog composite video signal inputted from a terminal 11 is supplied to a synchronization separation circuit 12, by which a horizontal synchronizing signal (H. SYNC) and a vertical synchronizing signal (V. SYNC) are separated from the analog composite video signal. In this instance, it is necessary to take a countermeasure using such a monostable multivibrator as shown in FIG. 32 so that the horizontal synchronizing signal and the vertical synchronizing signal may not be disturbed by pseudo SYNC chips of a copyright protection signal.

The separated vertical synchronizing signal is supplied to a PLL circuit 13, by which a reference clock signal of 13.5 MHz is produced. The reference clock signal is supplied to a decoder circuit 14, by which a sampling clock signal of 1.35 MHz illustrated in FIGS. 26(a) to 26(c) is produced.

The copyright protection signal detection circuit 19 has the construction shown in FIG. 32. While the copyright protection signal detection circuit 19 discriminates presence or absence of a copyright protection signal, the inputted composite video signal is delayed by a 1H analog delay circuit 15.

The output of the 1H analog delay circuit 15 is always digitized by a 4-bit analog to digital (A/D) converter 16. When the copyright protection signal detection circuit 19 detects presence of a copyright protection signal, this is written into a memory 17 under the control of a read/write control circuit 20. The memory 17 stores sample data for each one line and can store sample data for 8 lines each including 4 bits×72 samples. It is to be noted that an address generation circuit 18 generates a write or read address and a chip select signal for the memory 17.

In the present embodiment, since it is sufficient to watch for 20 lines to the utmost of the first field, packing into a line pack is performed within the remaining time. An H counter circuit 21 supplies a line number as LINES data to a line pack processing microcomputer 23 when the copyright protection signal is present. The data of the memory 17 are similarly supplied as line data to the line pack processing microcomputer 23 under the switching control of a switching circuit 22. Using these LINES data, the line pack processing microcomputer 23 generates such data as illustrated in FIG. 29 and sends the data to the format converter shown in FIG. 31.

Figure 35:
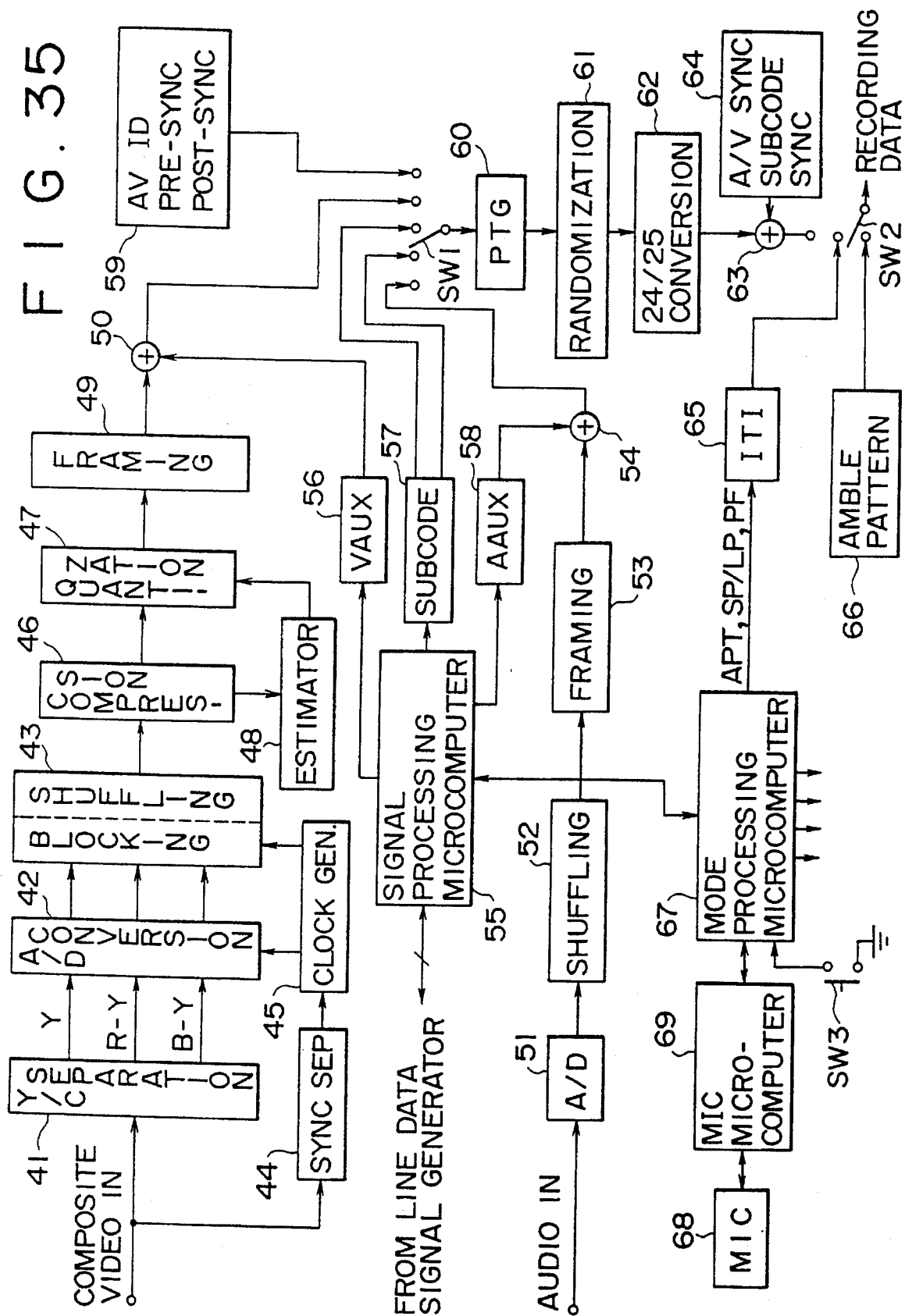
FIG. 35 is a block diagram showing an example of the construction of a format converter.

Subsequently, the format converter will be described with reference to FIG. 35. The format converter is provided as an interface with line data in a digital video tape recorder for exclusive use for recording.

An analog composite video signal inputted to the format converter is separated into Y, R-Y and B-Y component signals by a Y/C separation circuit 41 and then supplied to an analog to digital (A/D) converter 42. Meanwhile, the analog composite video signal is supplied also to a synchronization separation circuit 44, by which a synchronizing signal is separated. The synchronizing signal is supplied to a clock generator 45. The clock generator 45 generates a clock signal for the A/D converter 42 and a blocking shuffling circuit 43.

The component signals inputted to the A/D converter 42 are processed by A/D conversion. In particular, in the case of the 525/60 system, the Y signal is converted by A/D conversion with the sampling frequency of 13.5 MHz, and the color difference signal is converted with the sampling frequency of 13.5/4 MHz. Meanwhile, in the 625/50 system, the Y signal is converted by A/D conversion with the sampling frequency of 13.5 MHz, and the color difference signal is converted with the sampling frequency of 13.5/2 MHz. Then, only those data of the A/D conversion outputs which are within an effective scanning period are supplied to the blocking shuffling circuit 43.

The blocking shuffling circuit 43 collects 8 samples in the horizontal direction and 8 samples in the vertical direction from the effective data of Y, R-Y and B-Y to make up data of a block. It performs shuffling in units of 6 blocks including four blocks for Y, one block for R-Y and one block for B-Y in order to raise the compression efficiency of the image data and disperse errors upon playback. The output data of the blocking shuffling circuit 43 are supplied to a compression coding circuit 46.

The compression coding circuit 46 performs DCT (Discrete Cosine Transform) for the thus inputted block data of 8 samples in the horizontal direction and 8 lines in the vertical direction and outputs a result of the DCT to an estimator 48 and a quantizer 47. The quantizer 47 determines a quantization step based on the output of the estimator 48, performs data compression using variable length coding and outputs data to a framing circuit 49. The framing circuit 49 frames the compressed image data into the format of FIG. 16 and outputs the framed and compressed image data to a composer 50.

An input audio signal is converted into a digital audio signal by an analog to digital (A/D) converter 51, performed by disperse processing by a shuffling by a shuffling circuit 52 and then framed into the format of FIG. 12 by a framing circuit 53. The output of the framing circuit 53 is supplied to a composer 54.

A track number to be stored into respective pack data of VAUX, AAUX and sub codes and an ID for sub code data is fetched through a line data signal generator into a signal processing microcomputer 55. It is respectively applied to an IC 56 for VAUX, an IC 57 for sub codes and an IC 58 for AAUX, which are interfaces between the microcomputer 55 and the hardware. The IC 56 for VAUX produces pack data of AP2 and VAUX and outputs them at a predetermined timing to the composer 50. Consequently, the video data and the video auxiliary data are composed into data of the format of FIG. 16. Meanwhile, the IC 57 for sub codes produces data SID for the ID portion, AP3 and pack data SDATA of 5 bytes. Further, the IC 58 for AAUX produces a pack of AP1 and AAUX and outputs the same at a predetermined timing to the composer 54. Consequently, the audio data and the audio auxiliary data are composed into data of the format of FIG. 12.

The outputs of the composer 50, the IG 57 for sub codes and the composer 54 are supplied to a first switching circuit SW1. Also the output of an AV ID, Pre-SYNC, Post-SYNC generator 59 is supplied to the first switching circuit SW1. By changing-over the switching circuit SW1 at a predetermined timing, ID, Pre-SYNC and Post-SYNC are added to the outputs of the composer 50 and the composer 54.

The output of the first switching circuit SW1 is additionally provided with a predetermined parity by a parity generation circuit 60 and then supplied to a randomization circuit 61 and further to a 24/25 conversion circuit 62. Here, the randomization circuit 61 randomizes the input data in order to remove DC components of the data. Meanwhile, the 24/25 conversion circuit 62 performs processing of adding one bit to each 24 bits of the data to provide a pilot signal component and pre-coding processing (partial response class IV) suitable for digital recording.

The data obtained in this manner are supplied to a composer 63, by which the data are composed with audio, video and sub code SYNC patterns generated by a SYNC generator 64. The output of the composer 63 is supplied to a second switching circuit SW2. Also ITI data outputted from an ITI generator 65 and an amble pattern outputted from an amble pattern generator 66 are supplied to the second switching circuit SW2. APT, SP/LP and PF data are supplied from a mode processing microcomputer 67 to the ITI generator 65. The ITI generator 65 inserts the thus received data into predetermined positions of the TIA of FIG. 2 and supplies the output data to the second switching circuit SW2. Accordingly, by changing-over the switching circuit SW2 at a suitable timing, an ample pattern and ITI data can be added to the output of the composer 63. The output of the second switching circuit SW2 is amplified by a recording amplifier (not shown) and recorded onto a magnetic tape (not shown) by means of a magnetic head (not shown).

The mode processing microcomputer 67 performs control of a mode of the entire apparatus. A third switching circuit SW3 connected to the mode processing microcomputer 67 performs setting of an SP/LP mode, and a result of such setting is detected by the mode processing microcomputer 67 and transmitted to the signal processing microcomputer 55, an MIC microcomputer 69 and a mechanism control microcomputer, (not shown) by way of inter-microcomputer communications.

The MIC microcomputer 69 is provided to perform MIC (Memory In Cassette) processing. Pack data, APM and so forth are produced by the MIC microcomputer 69 and supplied to an MIC 68 within a cassette (not shown) with an MIC by way of an MIC contact (not shown).

2-1-2. Playback System

Figure 36:
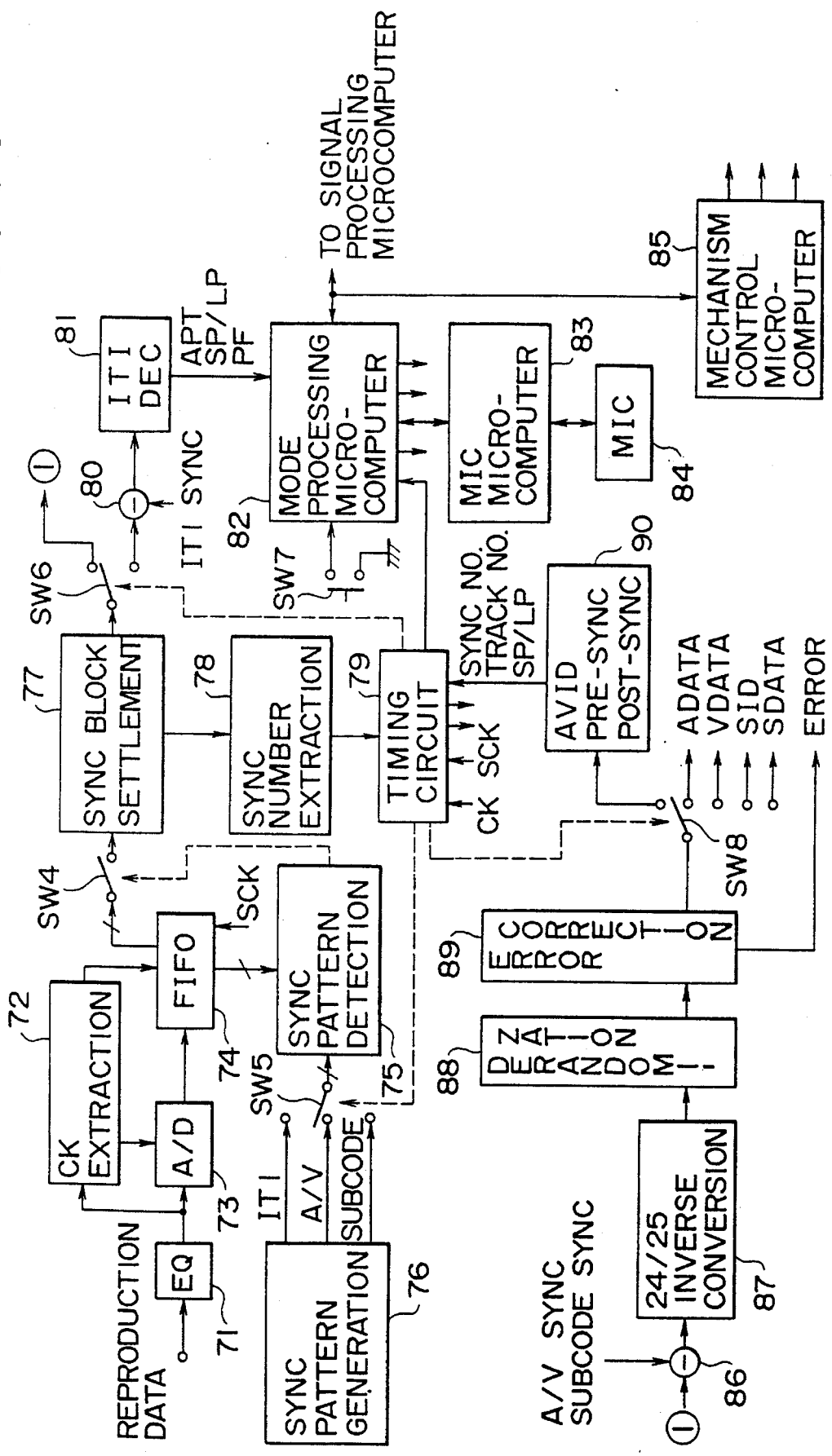
FIG. 36 is a block diagram showing an example of the construction of part of a reproduction system of a digital video tape recorder.

Subsequently, an example of a circuit of the playback and decoding side of FIG. 31 will be described. First, an example of a playback side circuit of a digital video tape recorder to which the present invention is applied will be described with reference to FIGS. 36 and 37.

A weak signal reproduced from a magnetic tape (not shown) by means of a magnetic head (not shown) is amplified by a head amplifier (not shown) and applied to an equalizer circuit 71. The equalizer circuit 71 performs reverse processing to emphasis processing (for example, partial response class IV) which was performed in order to enhance the electromagnetic conversion characteristic between a magnetic tape and the magnetic head upon recording.

A clock signal CK is extracted from the output of the equalizer circuit 71 by a clock extraction circuit 72. The clock signal CK is supplied to an analog to digital (A/D) converter 73 to convert the output of the equalizer circuit 71 into a digital value. One-bit data obtained in this manner is written into a FIFO memory 74 using the clock signal CK.

The clock signal CK is a signal which includes jitter components of a rotary head drum and is unstable with respect to time. However, since data themselves before A/D conversion include jitter components, there is no problem in sampling itself. However, when it is intended to extract image data or the like from such data, the data must be stable with respect to time. Time-base adjustment of the data is, therefore, performed using the FIFO memory 74. In short, whereas writing is performed using an unstable clock signal, reading out is performed using a stable clock signal SCK received from a self-excitation oscillator 91 which employs a quartz oscillator or a like element. The FIFO memory 74 must have a sufficient depth so that data may not be read out at a higher speed than the inputting speed of input data.

The outputs of individual stages of the FIFO memory 74 are applied to a SYNC pattern detection circuit 75. A SYNC pattern of each area is supplied from a fifth switching circuit SW5 to the SYNC pattern detection circuit 75 under the switching control of a timing circuit 79. The SYNC pattern detection circuit 75 has a flywheel construction and detects, once a SYNC pattern is detected, whether or not the same SYNC pattern arrives after a predetermined SYNC block length after detection of the SYNC pattern. The SYNC pattern detection circuit 75 is constructed such that, if such detection occurs, for example, three times or more, it considers the SYNC pattern to be true in order to prevent a detection error. The depth of the FIFO memory 74 is required to correspond to the number of such detections.

After a SYNC pattern is detected in this manner, a shift amount is determined by checking which portions of the outputs of the individual stages of the FIFO memory 74 should be extracted in order to extract one SYNC block. Based on the determination of shift amount, the fourth switching circuit SW4 is closed to fetch necessary bits into a SYNC block settlement latch 77. The SYNC number thus fetched is extracted from the SYNC block settlement latch 77 by a SYNC number extraction circuit 78 and supplied to the timing circuit 79. Since it can be understood from the thus read SYNC number at which position on the track the head is scanning, a fifth switching circuit SW5 and a sixth switching circuit SW6 are switched in response to the SYNC number.

The sixth switching circuit SW6 changes to the lower side while the head is scanning the ITI sector so that an ITI SYNC pattern can be removed from the output of the SYNC block settlement latch 77 by a subtractor 80. The output of the subtractor 80 is applied to an ITI decoder 81. Since the data in the ITI area are recorded in a coded condition, APT, SP/LP and PF data can be extracted by decoding the data. The data from the ITI decoder 81 is supplied to a mode processing microcomputer 82 which determines an operation mode of the entire apparatus and so forth, and to which a seventh switching circuit SW7 for setting an SP/LP mode is connected. The mode processing microcomputer 82 cooperates with a mechanism control microcomputer 85 and a signal processing microcomputer 100 to perform system control of the entire set.

An MIC microcomputer 83 for controlling the APM and so forth is connected to the mode processing microcomputer 82. Information from an MIC 84 within a cassette (not shown) with an MIC is supplied to the MIC microcomputer 83 by way of an MIC contact switch (not shown) so that the MIC microcomputer 83 cooperates with the mode processing microcomputer 82 to perform MIC processing. Depending upon the set, the MIC microcomputer 83 may be omitted so that MIC processing may be performed by the mode processing microcomputer 82.

When the head is scanning the A/V sector or the Sub code sector, the sixth switching circuit SW6 is switched on the upper side. After SYNC patterns of individual sectors are extracted by the subtractor 86, they are passed through a 24/25 inverse conversion circuit 87 and then applied to a derandomization circuit 88 to obtain an original data train. The data extracted in this manner are supplied to an error correction circuit 89.

The error correction circuit 89 performs detection and correction of error data using parities having been added on the recording side. However, any error data which have not successfully been removed at all are outputted together with an ERROR flag. Each data from the error correction circuit 89 is outputted under the switching control of an eighth switching circuit SW8. An AVID, Pre-SYNC, Post-SYNC extraction circuit 90 extracts SYNC numbers and track numbers stored in the A/V sectors and the Pre-SYNC and Post-SYNC blocks as well as an SP/LP signal stored in the Pre-SYNC blocks. The signals thus extracted are supplied to the timing circuit 79 so as to produce various timings.

The SP/LP signal is compared with an SP/LP signal obtained from the ITI by the mode processing microcomputer 82. SP/LP information is written by three times in the TIA area of the ITI area, and a majority operation is performed for the SP/LP information within the TIA area to improve reliability. Two Pre-SYNC data are included in each of the audio signal and the video signal, and consequently, the SP/LP information is written at a total of four locations. Also here, a majority operation is performed within the locations to improve reliability. Then, when the two do not finally coincide with each other, the SP/LP information from the ITI area is given a priority to be adopted.

VDATA outputted from the eighth switching circuit SW8 are separated into video data and video auxiliary data by a ninth switching circuit SW9. Then, the video data are supplied to a deframing circuit 94 together with error flags.

The deframing circuit 94 performs reverse conversion to framing performed on the recording side and recognizes a nature of data packed therein. When there remains an error which could not have been removed from certain data, since the deframing circuit 94 recognizes what influence the error has on the other data, it performs propagation error processing. By such propagation error processing, the ERROR flag is changed to a VERROR flag which includes a propagation error. Further, the deframing circuit 94 performs processing of those error image data which are not very significant for reproduction of an image by providing with certain processing to delete the error flags.

The video data are passed through a dequantization circuit 95 and a decompression circuit 96 to restore the data before compression. Subsequently, the data are returned to data of the original image space arrangement by a deshuffling and deblocking circuit 97. After the data are returned to data of the actual image space, repair of the image becomes possible based on the VERROR flags. In short, such processing is performed, that image data of the last frame are always stored in a memory and an image block with an error is replaced by that of the last image.

After the deshuffling, the data are handled separately for three signals of a brightness signal and color difference signals. Then, the data are restored into analog components of Y, R-Y and B-Y by digital to analog (D/A) converters 101 to 103, respectively. As clock signals in this instance, the outputs are used from the oscillation circuit 91 and the frequency divider 92 obtained by dividing the output of the oscillation circuit 91. In particular, the frequency of 13.5 MHz is used for the Y component, and the frequency of 6.75 MHz or 3.375 MHz is used for the R-Y and B-Y components.

The signal components obtained in this manner are composed by a Y/C composition circuit 104, further composed with the composite synchronizing signal from the synchronizing signal generation circuit 93 by a composer 105 and then outputted as a composite video signal from a terminal 106.

The ADATA outputted from the eighth switching circuit SW8 are separated into audio data and audio auxiliary data by a tenth switching circuit SW10. Then, the audio data are supplied to a deframing circuit 107 together with the ERROR flags. The deframing circuit 107 performs reverse conversion to framing performed on the recording side and recognizes a nature of the data packed therein. When there remains an error which could not have been removed from certain data, since the deframing circuit 107 recognizes what influence the error has on the other data, it performs propagation error processing. For example, in the case of 16-bit sampling, since one data is constituted from 8 bits, an ERROR flag is changed to an AERROR flag which includes a propagation error.

The audio data are restored on the original time base by a deshuffling circuit 108 on the next stage. In this instance, a repairing operation for the audio data is performed based on the AERROR flag mentioned above. In short, such processing as holding a preceding value is performed for substituting the error with sound just prior to the error. When the error period is so long that repair is impossible, such a countermeasure as muting is performed to stop the sound itself.

After such countermeasure is taken, the audio data are returned into an analog value by a digital to analog (D/A) converter 109 and then outputted from an analog audio output terminal 110, maintaining a proper timing with the image data.

The VAUX and AAUX data separated by the ninth and tenth switching circuits SW9 and SW10 are processed by pre-processing such as majority processing at an IC 98 for VAUX and an IC 111 for AAUX, respectively, taking error flags into consideration. The ID data SID and the pack data SDATA of the sub code sector are supplied to an IC 112 for sub codes. Also the IC 112 for sub codes performs pre-processing such as majority processing taking error flags into consideration. Thereafter, the output of the IC 112 for sub codes are supplied to the signal processing microcomputer 100, by which a final reading operation is performed. Those errors which could not have been removed then are supplied as VAUXER, SUBER and AAUXER to the signal processing microcomputer 100. It is to be noted that the IC 98 for VAUX, the IC 111 for AAUX and the IC 112 for sub codes also perform processing for producing AP2, AP3 and AP1, respectively.

The error processing for auxiliary data will be described in more detail. Each area includes a main area and an optional area. In the case of the 525/60 system, same data are written by ten times in the main area. Accordingly, even if some of them are in error, the data can be recovered using the other data, and consequently, any ERROR flag there is not in error any more. However, since data are written only once in the optional areas other than that for sub codes, errors in the optional areas will remain as VAUXER, SUBER and AAUXER as they are.

The signal processing microcomputer 100 performs propagation error processing, data repairing processing and so forth by analogical inference from the implication of packs of data. A result of such determination is supplied to the mode processing microcomputer 82 so that it is used as a material for decision of a behavior of the entire set.

The copyright protection signal generation circuit 99 operates in response to signals received from the IC 98 for VAUX, the synchronizing signal generation circuit 93 and the timing circuit 79. Then, in response to a line number coincidence output of the copyright protection signal generation circuit 99, an eleventh switch SW11 is switched to the lower side in FIG. 37 so that the line data output is sent into the D/A converter 101. Consequently, such a copyright protection signal as seen in FIG. 25 is inserted into a predetermined line. When the copyright protection signal is to be composed in an analog fashion, it is inserted by the composer 105.

Subsequently, the copyright protection signal generation circuit 99 will be described with reference to FIG. 38. The IC 98 for VAUX reads in line data from the storage area of FIG. 30. Then, the IC 98 for VAUX immediately discriminates contents of the line data and directly extracts a line number from the LINES data and line data from the line data pack for Y. The data thus extracted are stored into a memory 201 in FIG. 38.

The memory 201 includes eight chips for storing line data of 4 bits×72 samples and a line number. Writing and reading operations of the memory 201 are controlled by a control signal outputted from a read/write control circuit 203 and an address signal and a chip select signal generated by an address generation circuit 202.

The contents of the memory 201 are cleared only once when the power to the video tape recorder is turned on. Further, a VAUXER is supplied from IC 98 for VAUX to the memory 201. Consequently, the memory 201 is controlled so that, when there is a VAUXER, it does not fetch line data and a line number, and data fetched last are used in place of the error values. Since the copyright protection signal does not exhibit an extreme variation between different frames but exhibits a very high correlation to the last frame as described above, such error processing is possible as described above.

Figure 37:
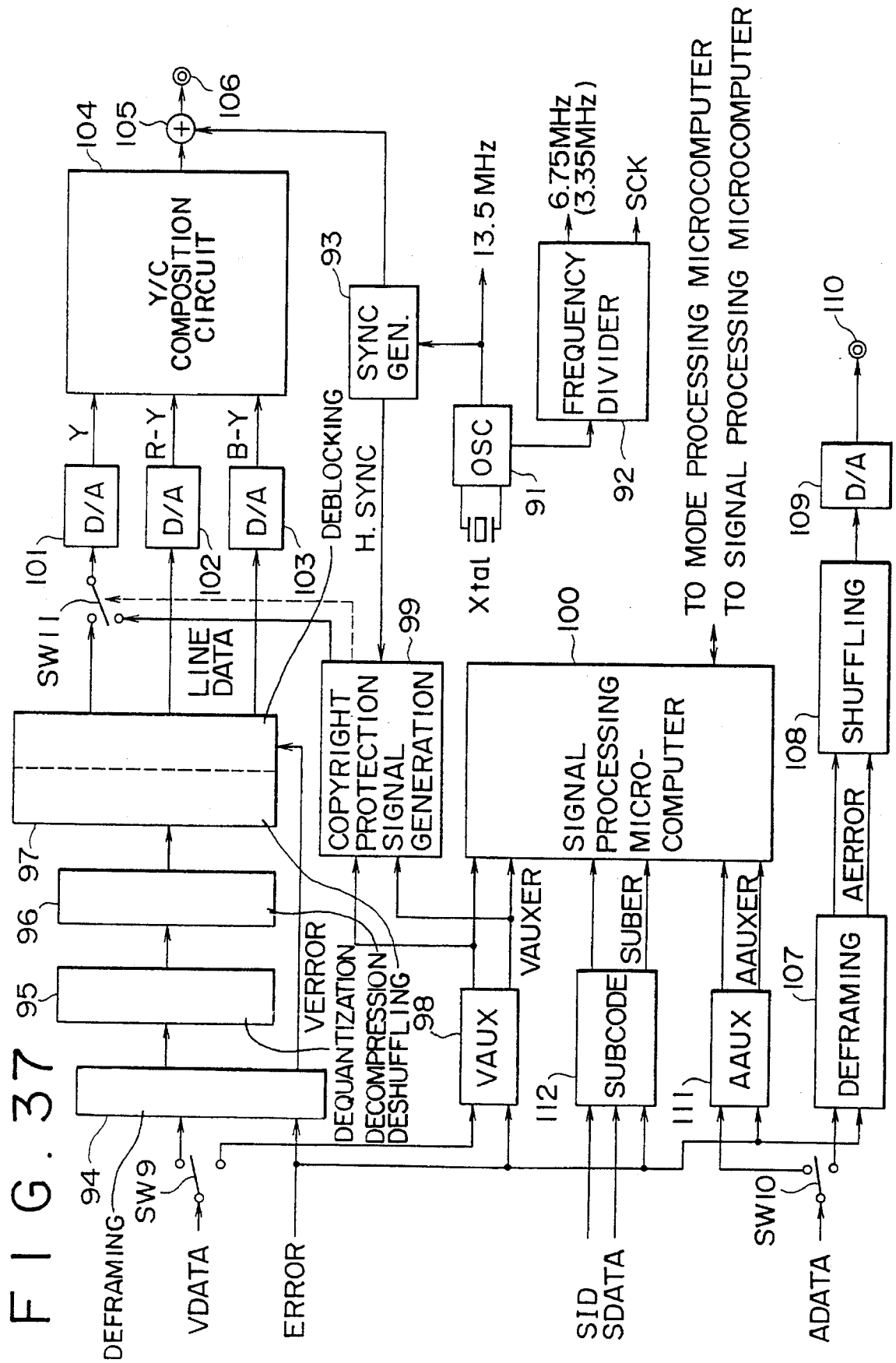
FIG. 37 is a block diagram showing an example of the construction of part of the reproduction system of the digital video tape recorder.

The line data read out from the memory 201 are latched by a line data latch 205. The line data latch 205 in advance latches 0000 to be added as the lower 4 bits to the line data. Meanwhile, the line number read out from the memory 201 is latched by a line number latch 204. Then, coincidence between a value obtained from an H counter 206 counting a horizontal synchronizing signal generated from the synchronizing signal generation circuit 93 and the latched value of the line number latch 204 is detected by a comparator 207. Using the output of the comparator 207 representing detection of such coincidence, the switch SW11 of FIG. 37 is switched to the lower side as described above so that the line data of 8 bits outputted from the line data latch 205 are inserted at a proper timing by the timing circuit 79. Having now fully described the invention, it will be apparent to one of ordinary skill in the art that many changes and modifications can be made thereto without departing from the spirit and scope of the invention as set forth herein.

What is claimed is:

1. A method of recording a digital image signal which has a recording format including a recording area for a coded image signal and another recording area for incident information, the recording area for incident information having a pack structure which includes a header pack for recording line designation data designating an arbitrary line of the image signal and a parameter regarding coding of the recording signal and a data pack for recording data obtained by coding a signal of a line designated by the header pack in accordance with the parameter, comprising the steps of:

coding and recording the image signal into the recording area for an image signal;

recording data designating a predetermined line of a copyright protection signal inserted in the predetermined line of the image signal and a parameter regarding coding of the copyright protection signal into the header pack; and recording the coded copyright protection signal into the data pack.

2. A digital image signal recording apparatus for recording a digital image signal which has a recording format including a recording area for a coded image signal and another recording area for incident information, the recording area for incident information having a pack structure which includes a header pack for recording line designation data designating an arbitrary line of the image signal and a parameter regarding coding of the recording signal and a data pack for recording data obtained by coding a signal of a line designated by the header pack in accordance with the parameter, comprising:

means for coding and recording the image signal into the recording area for an image signal; and means for recording data designating a predetermined line of a copyright protection signal inserted in the predetermined line of the image signal and a parameter regarding coding of the copyright protection signal into the header pack and recording the coded copyright protection signal into the data pack.

3. A digital image signal recording apparatus as claimed in claim 2, wherein information instructing that same contents should be restored in same lines of a first field and a second field of the image signal is recorded into the header pack so that only one of the fields of the copyright protection signal having the same contents in the same lines of the first field and the second field is coded and recorded into the data pack.

4. A digital image signal recording apparatus as claimed in claim 2, wherein, when the copyright protection signal is to be coded, a portion of the image signal higher than a pedestal level is quantized finely.

5. A method of reproducing a digital image signal which has a recording format including a recording area for a coded image signal and another recording area for incident information, the recording area for incident information having a pack structure which includes a header pack for recording line designation data designating an arbitrary line of the image signal and a parameter regarding coding of the recording signal and a data pack for recording data obtained by coding a signal of a line designated by the header pack in accordance with the parameter, the coded image signal being recorded in the recording area for an image signal, data designating a predetermined line of a copyright protection signal inserted in the predetermined line of the image signal and a parameter regarding coding of the copyright protection signal being recorded in the header pack, the coded copyright protection signal being recorded in the data pack, comprising the steps of:

reading the coded image signal from the recording area for an image signal and decoding the read out image signal;

reading the header pack and the data pack to restore the copyright protection signal; and inserting the restored copyright protection signal into the predetermined line of the decoded image signal.

6. A digital image reproduction apparatus for reproducing a digital image signal which has a recording format including a recording area for a coded image signal and another recording area for incident information, the recording area for incident information having a pack structure which includes a header pack for recording line designation data designating an arbitrary line of the image signal and a parameter regarding coding of the recording signal and a data pack for recording data obtained by coding a signal of a line designated by the header pack in accordance with the parameter, the coded image signal being recorded in the recording area for an image signal, data designating a predetermined line of a copyright protection signal inserted in the predetermined line of the image signal and a parameter regarding coding of the copyright protection signal being recorded in the header pack, the coded copyright protection signal being recorded in the data pack, comprising:

means for reading the coded image signal from the recording area for an image signal and decoding the read out image signal; and means for reading the header pack and the data pack to restore the copyright protection signal and inserting the restored copyright protection signal into the predetermined line of the decoded image signal.

7. A method of recording and reproducing a digital image signal which has a recording format including a recording area for a coded image signal and another recording area for incident information, the recording area for incident information having a pack structure which includes a header pack for recording line designation data designating an arbitrary line of the image signal and a parameter regarding coding of the recording signal and a data pack for recording data obtained by coding a signal of a line designated by the header pack in accordance with the parameter, comprising the steps of:

recording the image signal, the recording step including the steps of coding and recording the image signal into the recording area for an image signal, recording data designating a predetermined line of a copyright protection signal inserted in the predetermined line of the image signal and a parameter regarding coding of the copyright protection signal into the header pack, and recording the coded copyright protection signal into the data pack; and reproducing the image signal, the reproduction step including the steps of reading the coded image signal from the recording area for an image signal and decoding the read out image signal, reading the header pack and the data pack to restore the copyright protection signal, and inserting the restored copyright protection signal into the predetermined line of the decoded image signal.

8. A digital image signal recording and reproduction apparatus for recording and reproducing a digital image signal which has a recording format including a recording area for a coded image signal and another recording area for incident information, the recording area for incident information having a pack structure which includes a header pack for recording line designation data designating an arbitrary line of the image signal and a parameter regarding coding of the recording signal and a data pack for recording data obtained by coding a signal of a line designated by the header pack in accordance with the parameter, comprising:

means for coding and recording the image signal into the recording area for an image signal;

means for recording data designating a predetermined line of a copyright protection signal inserted in the predetermined line of the image signal and a parameter regarding coding of the copyright protection signal into the header pack and recording the coded copyright protection signal into the data pack;

means for reading the coded image signal from the recording area for an image signal and decoding the read out image signal; and means for reading the header pack and the data pack to restore the copyright protection signal and inserting the restored copyright protection signal into the predetermined line of the decoded image signal.

9. A digital image signal recording and reproduction apparatus as claimed in claim 6, wherein information instructing that same contents should be restored in same lines of a first field and a second field of the image signal is recorded into the header pack so that only one of the fields of the copyright protection signal having the same contents in the same lines of the first field and the second field is coded and recorded into the data pack.

10. A digital image signal recording and reproduction apparatus as claimed in claim 6, wherein, when the copyright protection signal is to be coded, a portion of the image signal higher than a pedestal level is quantized finely.

11. A recording medium on which a digital image signal is recorded, the image signal having a recording format including a recording area for a coded image signal and another recording area for incident information, the recording area for incident information having a pack structure which includes a header pack for recording line designation data designating an arbitrary line of the image signal and a parameter regarding coding of the recording signal and a data pack for recording data obtained by coding a signal of a line designated by the header pack in accordance with the parameter, the coded image signal being recorded in the recording area for an image signal, data designating a predetermined line of a copyright protection signal inserted in the predetermined line of the image signal and a parameter regarding coding of the copyright protection signal being recorded in the header pack, the coded copyright protection signal being recorded in the data pack.

12. The method of claim 1, wherein the parameter identifies a number of samples included in data packs following said header pack in said incident information.

13. The method of claim 1, wherein said incident information includes packs of data each having a common pack structure, said header pack and said data pack of said incident information each having the common pack structure.

14. The method of claim 1, wherein said data pack includes a plurality of data representing a copy protection signal that is to be coded in accordance with said parameter and inserted in the image signal in a line designated by said header pack.

15. The method of claim 5, wherein the parameter identifies a number of samples included in data packs following said header pack in said incident information.

16. The method of claim 5, wherein said incident information includes packs of data each having a common pack structure, said header pack and said data pack of said incident information each having the common pack structure.

17. The apparatus of claim 5, wherein said data pack includes a plurality of data representing a copy protection signal that is to be coded in accordance with said parameter and inserted in the image signal in a line designated by said header pack.

\* \* \* \* \*